US006665004B1

(12) United States Patent
Paff

(10) Patent No.: US 6,665,004 B1
(45) Date of Patent: Dec. 16, 2003

(54) GRAPHICAL WORKSTATION FOR INTEGRATED SECURITY SYSTEM

(75) Inventor: Robert Paff, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 08/438,479

(22) Filed: May 10, 1995

Related U.S. Application Data

(63) Continuation of application No. 08/166,599, filed on Dec. 13, 1993, now abandoned, which is a continuation of application No. 08/046,017, filed on Apr. 12, 1993, now abandoned, which is a continuation of application No. 07/696,349, filed on May 6, 1991, now abandoned.

(51) Int. Cl.[7] .................................................. H04N 7/18

(52) U.S. Cl. ...................................................... 348/156

(58) Field of Search .......................... 348/61, 143, 150, 348/152, 156, 159; 345/113, 118, 145, 146, 156, 157, 902; 395/155, 159, 161; 364/188; 340/525; H04N 7/18

(56) References Cited

U.S. PATENT DOCUMENTS 3,742,133 A * 6/1973 O'Sullivan .................. 348/156
3,811,008 A * 5/1974 Lee ............................ 358/146
4,074,225 A * 2/1978 Vandeweghe ............... 348/143
4,237,483 A * 12/1980 Clever ......................... 348/150
4,511,886 A * 4/1985 Rodriguez .................. 348/143
4,524,384 A * 6/1985 Lefkowitz et al. .......... 348/156
4,581,634 A * 4/1986 Williams .................... 348/156
4,777,526 A * 10/1988 Saitoh et al. ............... 348/159
4,814,869 A * 3/1989 Oliver, Jr. ................... 348/159
4,942,464 A * 7/1990 Milatz ........................ 358/108
4,962,473 A 10/1990 Crain ......................... 364/900
4,992,866 A * 2/1991 Morgan ....................... 358/108
5,095,196 A * 3/1992 Miyata ....................... 358/108

OTHER PUBLICATIONS

"Proceedings 1987 Carnahan Conference on Security Technology: Electronic Crime Countermeasures", J. C. Smart, Jul. 15–17, 1987, pp. 1–5.*

* cited by examiner

*Primary Examiner*—Richard Lee
(74) *Attorney, Agent, or Firm*—Robin, Blecker & Daley

(57) ABSTRACT

A graphical work station for use with security devices associated with a location in which the graphic work station provides a graphical image and direction relative to the graphical image enables functions to be performed within the work station, at the security devices and/or with respect to the location.

13 Claims, 37 Drawing Sheets

210

Map Palette ...

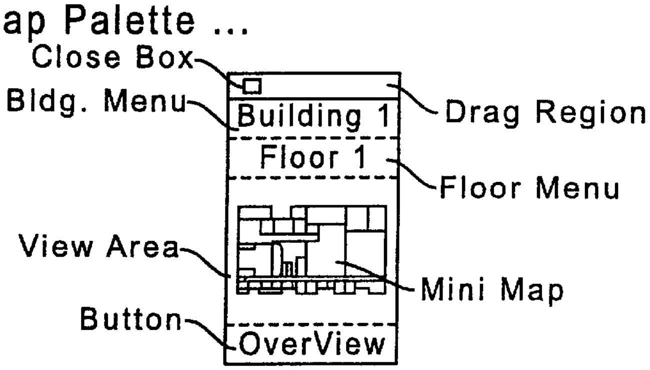

Controls the selection and viewing area of the expanded Control Map of the facility. The Bldg. Menu is a pull down Menu that allows you to select a specific building by name. The Floor Menu allows you to select a specific floor within the currently selected building. A small scale version of the selected building and floor is displayed in the Mini Map area. Clicking the mouse button over the Mini Map will cause the View Area rectangle to locate itself at the cursor position, and the expanded Control Map to scroll to the area shown within the View Area rectangle. The Full View button causes a smaller scale map of the expanded Control Map to be displayed.

215

FIG. 27

KeyPad Palette ...

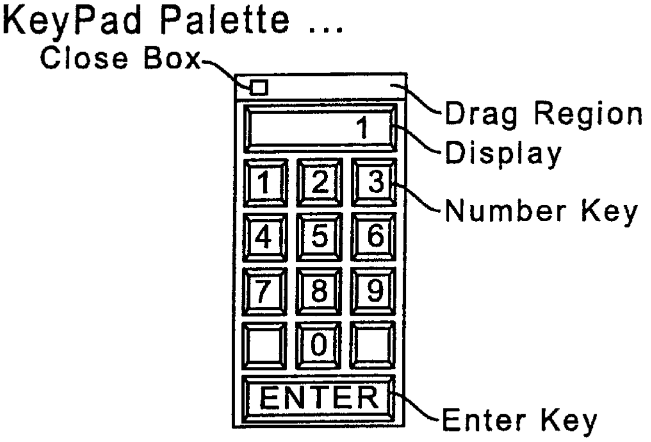

Provides for the selection of a dome when the dome number is known (as opposed to clicking on a dome icon shown on the Control Map of the facility). The dome number is reflected in the display area as the Number Keys are "pressed" using the mouse button. Clicking on the ENTER key calls-up the dome only if the dome exists in the system. If it doesn't, a beep is sounded, the display reverts back to the previously selected dome number and no video switch takes place. The display also reflects the number of a dome selected using the dome icons on the Control Maps.

225

FIG. 29

GRAPHICAL WORKSTATION FOR INTEGRATED SECURITY SYSTEM

This is continuation application under 37 CFR 1.62 of prior application Ser. No. 08/166,599, filed Dec. 13, 1991, abandoned, which is a continuation of Ser. No. 08/046,017, filed Apr. 12, 1993, abandoned, which is a continuation of Ser. No. 07/696,349, filed May 6, 1991, abandoned.

BACKGROUND OF THE INVENTION

This invention relates generally to security systems comprising various security functions and more particularly to a graphical control unit through which an operator can easily control the various security functions of the security system.

It is presently known to combine various security functions, such as CCTV, access control, alarm monitoring, point-of-sale monitoring and output control (i.e., lighting control), into a single security system for protecting a given premises. However, the individual security functions are often poorly integrated and have dedicated displays and input devices, such as computer screens and keyboards, through which an operator controls the given security functions. Therefore, to control such a security system requires that an operator, or a number of operators, interact with multiple screens and multiple keyboards, to control the various security functions.

In such security systems, the manner in which each individual security function operates is often different. As a result, the installation, operation, maintenance and upgrading of the security system is quite complex.

Further, the ability of an operator to control a given security function decreases as the total number of devices within that security function increases. Using the CCTV security function as a illustration, a large number of cameras, each having a unique address, may be mounted throughout the premises. The operator selects from among the cameras in the premises which camera's video signal is to be displayed on a given monitor. As the operator cannot easily remember all of the camera locations and their corresponding addresses, a list must be referred to. Then, after obtaining the desired camera's address from the list, the operator must enter the address of the desired camera through the keyboard.

The operation of a CCTV security function is further complicated for cameras which can pan and/or tilt to view predetermined targets or to follow a predetermined pattern. For such cameras, the operator must not only obtain the camera address from a list, but must also obtain a number corresponding to the desired target and/or pattern from a list. This requirement makes it very difficult for an operator to quickly control the cameras in emergency situations, such as, for example, visually tracking an intruder through the premises by sequentially selecting various cameras and targets corresponding to the intruder's position.

Even after an operator selects the address for a given pan and/or tilt type camera, the operator has no way of knowing which way the camera is facing until he views the displayed image. Therefore, the present CCTV security functions have disadvantages in situations where an operator desires to know which direction each camera is currently facing and in situations where the operator wants to preset the viewing direction of a second camera, such as when an intruder is leaving the field-of-view of one camera and entering the field of view of the second camera.

The other security functions have similar disadvantages when a large number of devices are supported by the security function. More particularly, there is no mechanism through which an operator can quickly determine the status of the various security functions and through which the operator can direct the functioning of the various security functions without requiring the operator to view lists of information.

It is an object of the present invention to provide an improved control unit for controlling a security system.

It is a further object of the present invention to provide a control unit which displays graphical images representative of a security device's type, location and status.

It is a still further object of the present invention to provide a control unit controlling security devices by giving directions related to graphical image representations of the security devices.

It is a further object of the present invention to provide a security system which utilizes an improved control unit meeting the above objectives.

SUMMARY OF THE INVENTION

In accordance with the principles of the present invention, the above and other objectives are realized in a control unit for use with a display and one or more security devices, where the control unit forms graphical images on the display associated with security devices, e.g., the status and location of the devices, and wherein functions to be performed by the security devices are enabled in response to directions related to the graphical images.

In the embodiment of the invention to be described hereinafter the control unit has a first means for enabling the forming of a graphical image on the display. The graphical image is associated with one or more security devices and/or with the location at which the security devices are situated. A second means is provided which is responsive to directions related to the graphical image to enable one or more functions to be performed in connection with the second means, one or more of the security devices and/or the location. In this way, an operator viewing the graphical image can quickly obtain information as to the devices and the location and by interacting with the graphical image, the operator can quickly enable various functions to be performed.

In the disclosed embodiment, the graphical image includes a floor plan and icons which are related to associated security devices. The icons are situated on the floor plan in positions corresponding to the placement of the associated security devices at the location. The appearance of an icon varies according to the type of associated security device and according to the status of the associated security device. The graphical image further includes one or more graphic sub-image control palettes and a pointing indicia which can be moved to point to areas on the graphical image. Functions related to the security devices are enabled by moving the pointing indicia to the position of the associated icon and/or to the position of a sub-image control palette and actuating a signalling device which is attached to the control unit.

Also disclosed is the use of a particular indicia or icon to depict security devices comprising a programmable camera means. The direction of the icon relative to the graphical image of the floor plan indicates the pan position of the programmable camera means, while the size or length of the icon indicates the tilt position of the programmable camera means. Accordingly, by viewing the icon on the graphical image, an operator can determine the pan and/or tilt position of the corresponding programmable camera means.

Further, in conjunction with a programmable camera means, target and pattern indicia are used in the graphical image to define predetermined pan and/or tilt positions or a pattern of these positions to which the camera means can be immediately directed. By moving the pointing indicia to the position of a target or pattern indicia and by actuating the signalling device, the control unit directs the associated programmable camera means to assume the predetermined pan and/or tilt positions or move through the pattern of such positions. In this way, an operator can quickly direct the programmable camera means to view predetermined areas corresponding to the target or pattern indicia.

Also usable with a programmable camera means is a further indicia defining a preselected region on a floor plan depicted by the graphical image. When the pointing indicia is placed at position inside the preselected region and the signalling device is actuated, the control unit directs the programmable camera means to assume pan and tilt positions such that the field of view of the camera is placed at the location in the premises corresponding to the position pointed to in the floor plan. In this way, an operator can easily direct a camera means to view a desired location regardless of the camera means initial pan and/or tilt positions.

The graphical image of the control unit can also be made to include a reference indicia which is superimposed over live video provided from a programmable camera means. When the operator moves the pointing indicia relative to the position of the reference indicia, the control unit directs the camera means to pan and/or tilt in the direction of the pointing indicia. In this way, an operator can direct the movement of a programmable camera means, so that the field of view centers on a desired location, by simply placing the pointing indicia upon the desired location as viewed on the live video.

Also disclosed are graphic sub-image programming windows which allow the addition of further indicia and corresponding functions for the control unit.

BRIEF DESCRIPTION OF THE DRAWINGS

The above and other features and aspects of the present invention will become more apparent upon reading the following detailed description in conjunction with the accompanying drawing in which:

FIG. 27 shows a map palette help window generated by the GCU that provides help information related to the map palette;

FIG. 29 shows a keypad palette help window generated by the GCU that provides help information related to the keypad palette;

DETAILED DESCRIPTION

Figure 1:
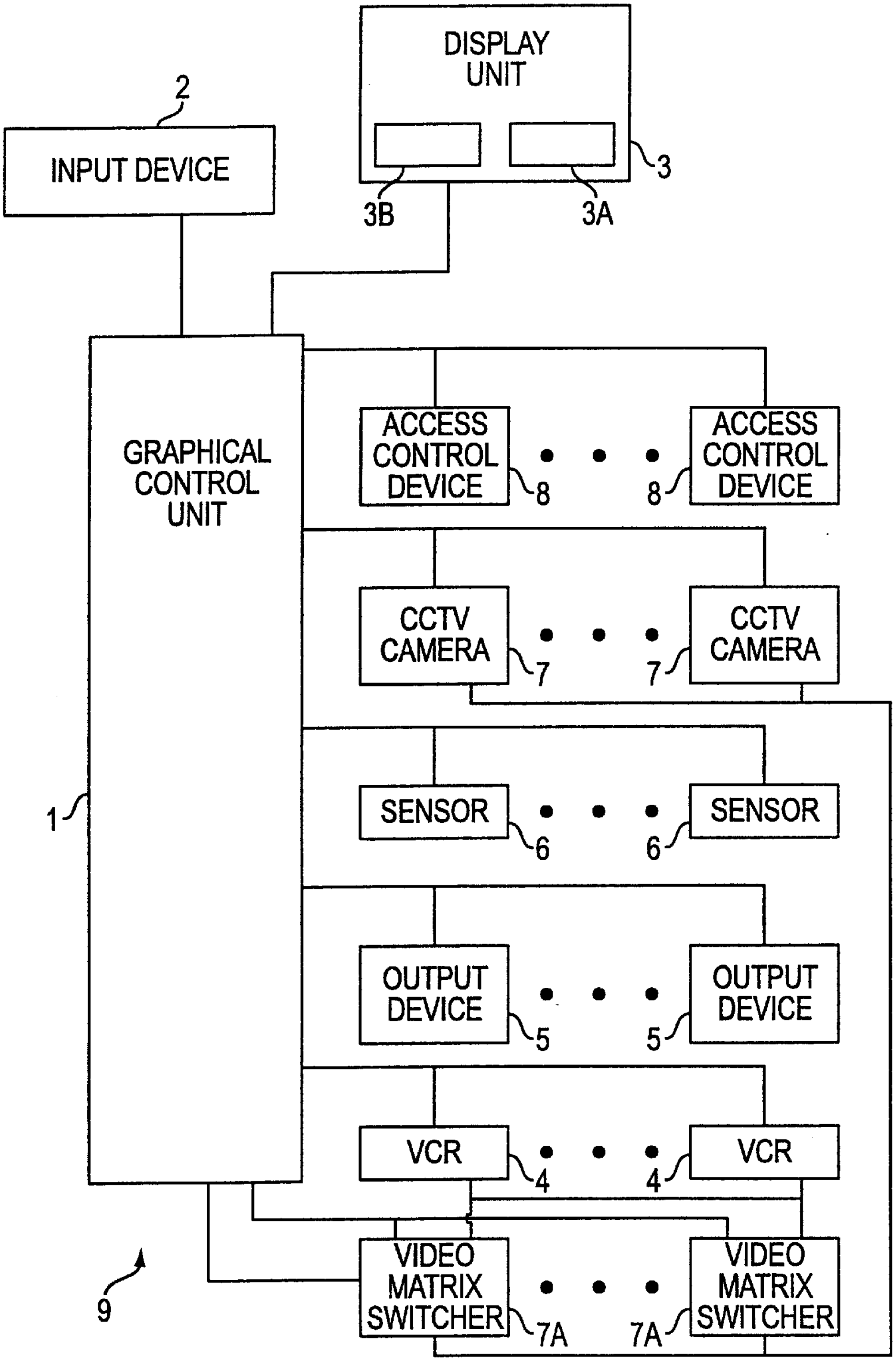
FIG. 1 is a block diagram illustrating an integrated security system having a graphical control unit (GCU) in accordance with the principles of the present invention.

FIG. 1 shows an integrated security system 9 for integrally controlling various security functions. A graphical control unit (GCU) 1 communicates with various types of security devices, such as video cassette recorders (VCRS) 4, output devices 5, sensors 6, CCTV cameras (Domes) 7 and access control devices 8. The GCU 1 also communicates with video matrix switchers 7A which selectively couple video signals from the CCTV cameras 7 and the VCRs 4 to the GCU. To enable effective management of the various security devices 4–8 and to carry out the desired security functions, the GCU 1 displays, upon a display unit 3 connected thereto, a combination of graphical and/or video images. The display 3 comprises one or more standard video monitors 3A and one or more higher resolution monitors 3B for selectively displaying these images.

The video images displayed are those received from selected CCTV cameras 7 and VCR's 4 and the graphical images are images generated by the GCU 1. Connected to the GCU 1 are input devices 2, such as a keyboard (not shown) and a hand held mouse (not shown), through which an operator enters control information.

Figure 2:
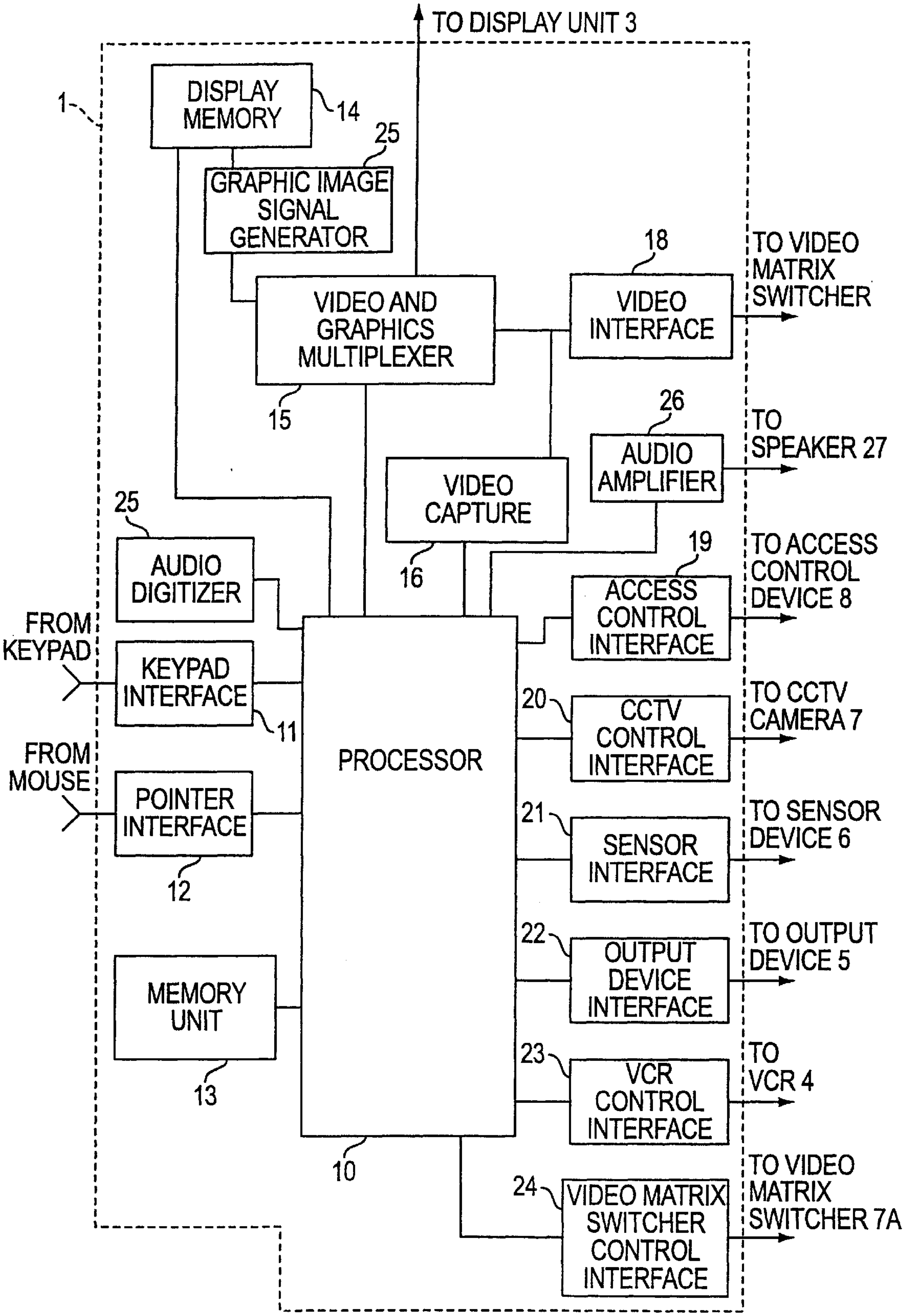
FIG. 2 is a block diagram showing in greater detail the GCU of FIG. 1.

FIG. 2 shows the GCU 1 of FIG. 1 in greater detail. A processor 10 connects to a memory unit 13 and to a display memory unit 14. The memory unit 13 is a standard storage device, for example, a hard disk drive, in which a control program and program variables are stored. The display memory 14 is a read/write memory which is periodically updated by the processor 10 to reflect the graphical image that is to be displayed. A graphic image signal generator 25 connects to the display memory 14 and forms a graphics signal, corresponding to the contents of the display memory 14, which is then provided to a video and graphics multiplexer (VGM) 15. The output of the VGM 15 is connected to the display unit 3. The VGM 15 connects to the processor 10 which can set the VGM 15 in a first mode in which the VGM sends the graphics signal to one or more of the high resolution monitors 3B and/or one or more of the video monitors 3A of the display unit 3.

Also selectively connected to the VGM 15 is a video interface 18. The interface 18 receives analog video signals from the video switchers 7A and provides the video signals received to the VGM 15. The VGM 15 can be set by the processor 10 to a second mode, in which, the received graphics signal from the generator 25 is superimposed on the analog video signal or on a digitized form of the analog video signal received from the interface 18 and the resultant signal sent to one or more of the video monitors 3A and/or one or more of the high resolution monitors 3B, respectively.

The video interface 18 also connects to a video capture circuit 16 which is connected to the processor 10. In response to a capture command issued by the processor 10, the video capture circuit 16 converts a single field or frame of the video signal supplied by the video interface 18 into a digital image. The processor 10 then stores the digital image in the memory unit 13 where it can be recalled and displayed at a later time.

Also connected to the processor 10 is an access control interface 19, a CCTV control interface 20, a sensor interface 21, an output device interface 22, a VCR control interface 23 and a video matrix switcher control interface 24, each of which enables communication between the processor 10 and the respective device to be controlled, i.e., security devices 4–8 and matrix switcher 7A. More particularly, the CCTV control interface 20 permits the processor 10 to send control signals to cameras 7 to control functions such as the focus, zoom, pan and tilt of the cameras 7. Further, the CCTV control interface 20 receives status information from the cameras 7 concerning the cameras status and provides such status information to the processor 10. The VCR control interface 23 permits the processor 10 to control the actions of remotely located VCR's. For example, the processor 10 can issue commands to the VCR 4 to turn ON, OFF, fast forward, rewind, play and record. The video matrix switcher control interface 24 enables the GCU 1 to transmit control signals to the switcher 7*a* to instruct the switcher to connect certain of the CCTV cameras and/or VCRs to the video interface 18.

The access control interface 19 transfers information between the processor 10 and access control devices 8, such as, for example, cardreaders, proximity sensors and keypads. The sensor interface 21 transfers information between the processor 10 and sensor devices 6, such as, for example, motion detectors, intrusion detectors and door switches. The output device interface 22 transfers output control signals from the processor 10 to control output devices such as, for example, alarm bells, lights, electronic gates and door locks. A keypad interface 11 and a pointer interface 12 are provided for connecting, respectively, a keyboard (not shown) and a pointing device (not shown), such as a mouse, to the processor 10.

Figure 3:
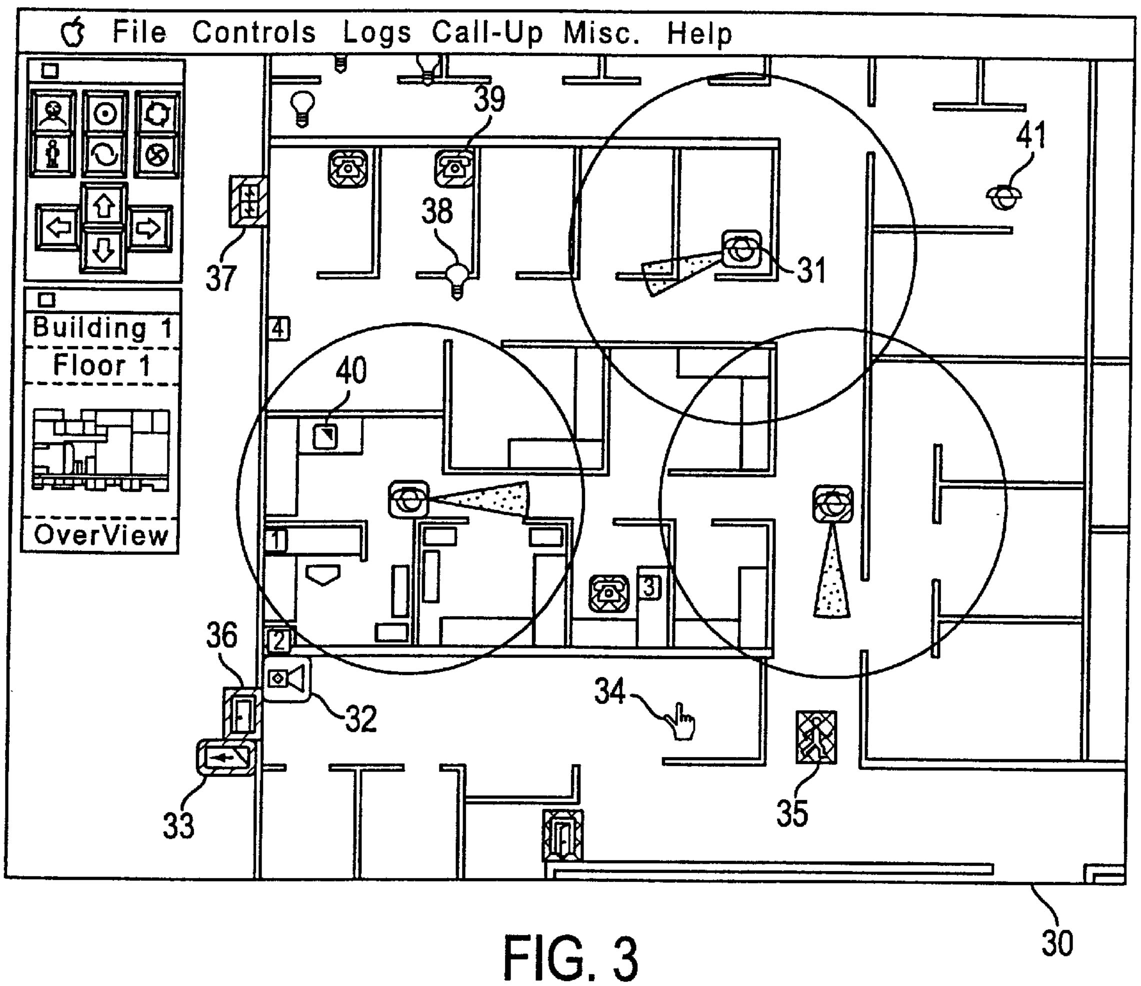
FIG. 3 shows a representative graphical image formed by the GCU.

In accordance with the principles of the present invention, the GCU 1 stores and displays graphical images of the floor plan for a protected premises. FIG. 3 shows a floor plan 30 for an illustrative protected premises as it appears on the display unit 3. The display unit 3 showing a selected portion of the facility floor plan, is an interactive graphical "control panel" through which the security devices 4–8 are controlled. Icons (small graphical representations) of physical devices, such as domes 31 (moveable cameras), fixed cameras 32 (non-moveable cameras), card readers 33, etc., are shown on the floor plan 30 in their relative locations, reflecting their actual position in the protected premises. To select a particular security device, the operator moves a pointing icon 34 by manipulating an input device 2, such as, for example, a mouse input device, and then depressing (clicking) a key on the mouse. For example, the operator can select a camera by moving the pointing icon 34 to the camera icon 32 and then clicking on the camera icon 32. This is significantly easier than having to look-up (or recall) the camera address and then entering the address at a keypad. The operator does not have to deal with camera addresses at all; he simply selects the appropriate icon.

Figure 4:
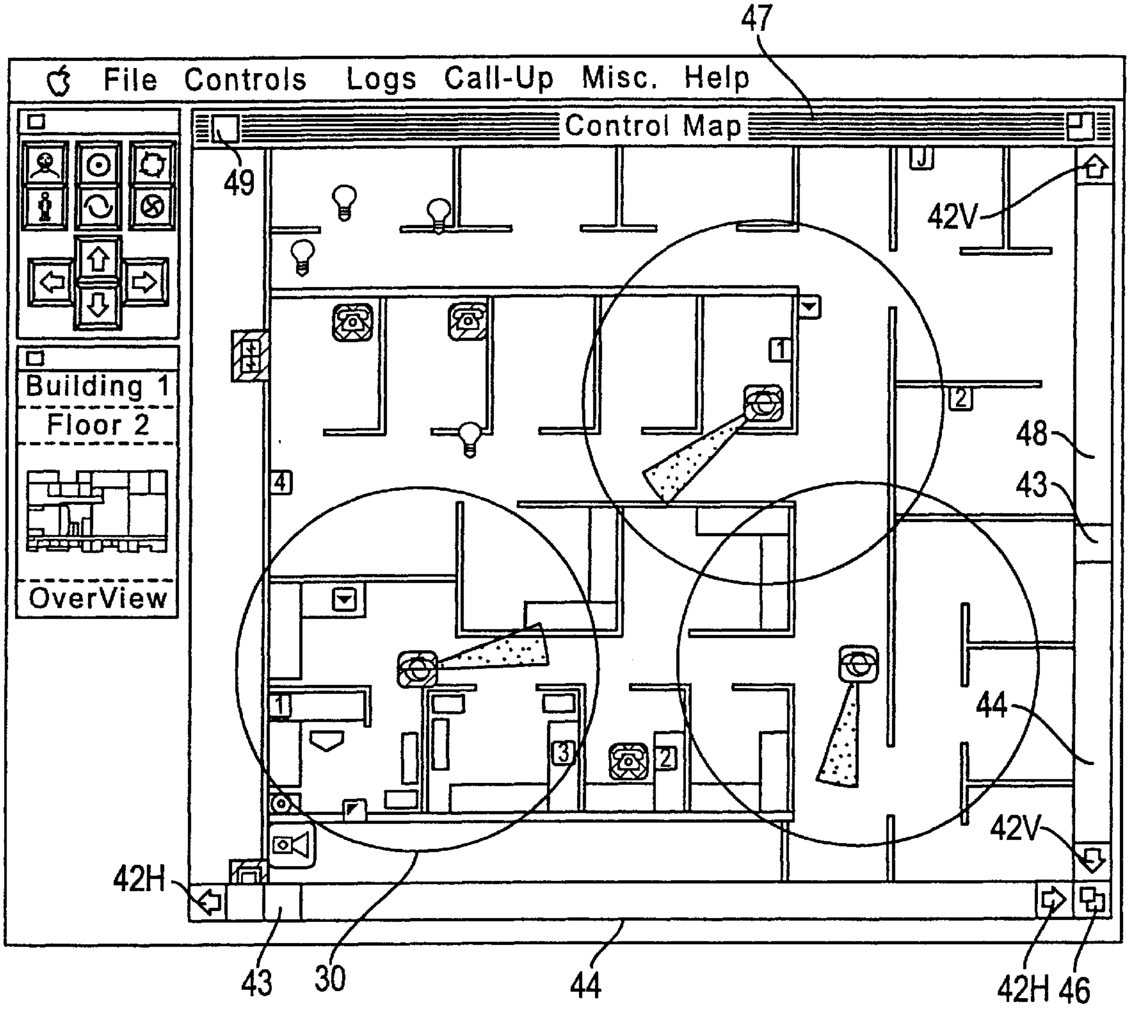
FIG. 4 further shows another graphical image formed by the GCU.

The floor plan 30 can be presented on the screen in two basic ways, as a full screen background image as shown in FIG. 3, or within a smaller window 48 as shown in FIG. 4. As a full screen image, the floor plan 30 would take up the entire viewing area of the screen. In actuality, the floor plan is still contained within a window, with the window being the same size as the screen of the display unit 3. As an image within a smaller window 48, the floor plan would take up less screen area, allowing multiple windows containing different floor plans to be visible simultaneously on the display unit 3.

Referring to FIG. 4, the size of the floor plan 30 can be much larger than the window 48 size, in which case only a portion of the floor plan 30 is visible "through" the window 48. In the case where the floor plan 30 is displayed in a smaller window, such as in FIG. 4, the visible portion of the floor plan 30 can also be changed by using the scroll arrows 42H and 42V and the thumbs 43 contained within the scroll bars 44. For example, placing the pointing icon 34 over the down arrow 42V and pressing the mouse button (i.e., clicking) causes the floor plan image 30 to scroll up, thereby exposing the lower portion of the floor plan 30. The thumb 43 indicates the relative position of the image within the window 48. The size of the window 48 can be changed by clicking and dragging (i.e., moving the pointing icon 34 while the mouse button is depressed) the size box 46 while the position of the window on the screen can be changed by clicking and dragging within the drag region 47. To close a particular window (i.e., remove the window from the display) the pointing icon 34 is clicked on a close box 49.

Figure 5:
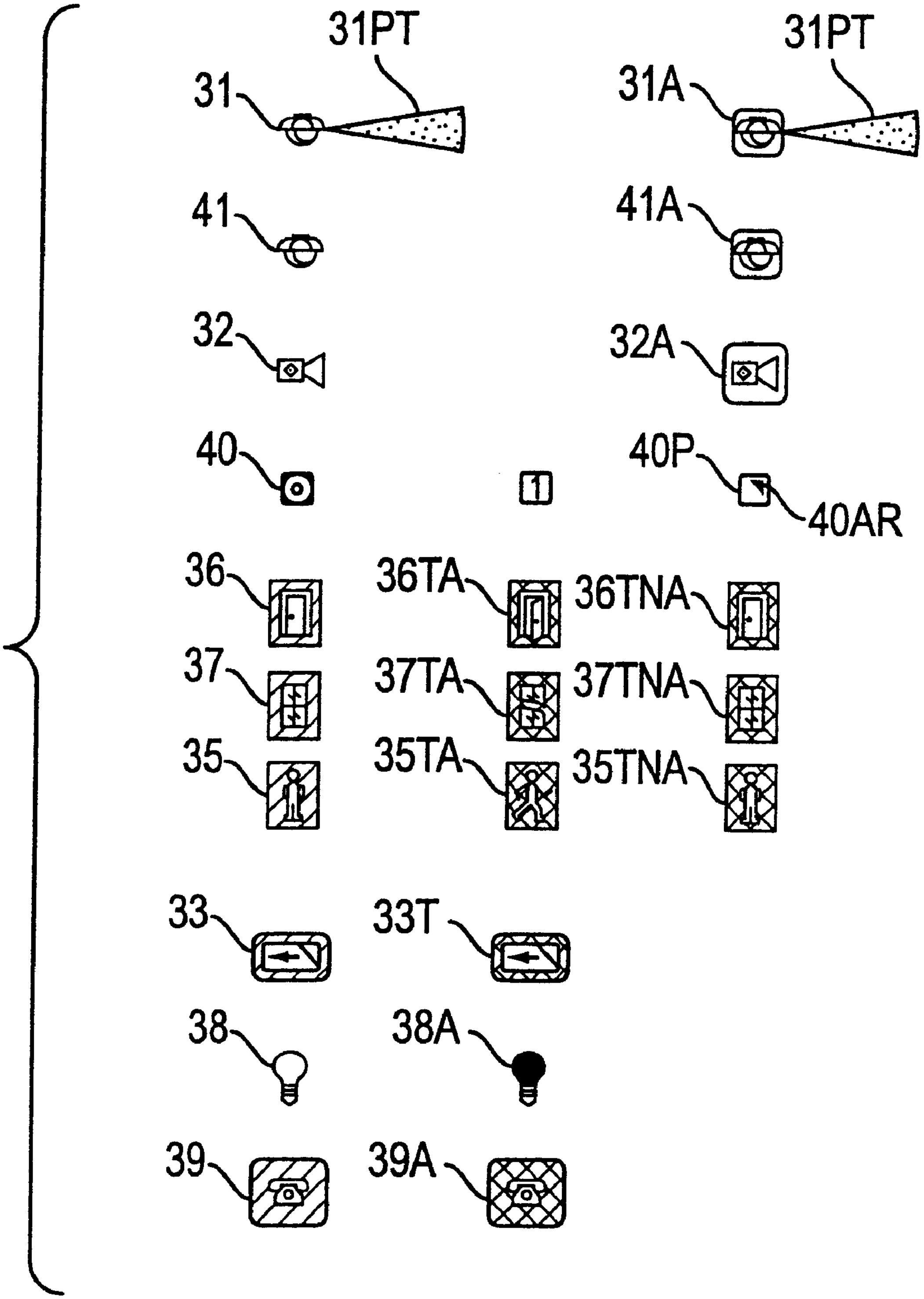
FIG. 5 shows graphical icons generated by the GCU which represent various physical devices in the integrated security system.

FIG. 5 shows various graphical icons which can be displayed on the floor plan 30 shown in FIG. 3. As shown, an icon can. provide several interface functions. It can, as above-indicated, represent a physical device, such as a camera, programmable dome, door, etc. It can also represent a specific function of a device, such as a target or pattern. By its placement on the floor plan 30, the icon can indicate the relative location of the device or the location of the target or pattern within the facility. It can additionally indicate the status of the device, such as selected, triggered, not triggered, active or inactive. An icon can also provide a way for the operator to select a device or to invoke a function (by clicking on it), or to get information about it (by double-clicking on it).

In FIG. 5, a programmable dome icon 31 represents an enhanced CCTV domed camera device that is capable of 360° pan; 90° tilt, zoom and focus control, and has the ability to electronically determine its pan, tilt, zoom and focus position. Clicking on a programmable dome icon 31 selects the camera represented by the programmable dome icon 31 as the source of the live video which the GCU 1 displays on the display unit 3. Upon being selected, the programmable dome icon 31A is highlighted and/or colored to visually indicate that the dome is currently selected. Further, the selected programmable dome is logically connected to a pan, tilt and zoom (PTZ) palette, which will be discussed later.

The programmable dome icon 31 has a pan/tilt direction icon segment 31PT which is a cone shaped extension which indicates the pan direction and the tilt position of the programmable dome camera. The tilt position is indicated by the length of the cone shaped extension. A short extension indicates the camera is pointing down towards the floor. A long extension indicates the camera is pointing up, viewing along the ceiling line. This feature is available in programmable domes only (which incorporate pan and tilt position sensing components), and represents a significant benefit to the operator. In a system that does not have this feature, an operator does not know the viewing direction of the camera until he selects the camera and looks at the monitor. It is often difficult to determine just where the camera is looking. There are many situations where an operator must preset the viewing direction of a second or third camera, such as when a subject is leaving the field-of-view of one camera and entering the field-of-view of a second camera. Also, an operator may want to use a second camera to view the subject from a different angle. Using the pan/tilt direction icon 31PT, the operator can easily determine where the second or third camera is looking by simply looking at the pan/tilt direction icon 31PT, and then quickly panning and tilting the camera to the desired view.

A non-programmable dome icon 41 represents a standard CCTV domed camera device capable of 360° pan, 90° tilt, zoom and focus control, but which does not have electronics for feeding back its current pan, tilt, zoom and focus information. Clicking on a non-programmable dome icon 41 results in GCU 1 displaying the video from the selected dome camera on the display unit 3. Upon being selected, the non-programmable dome icon 41A is highlighted and/or colored to visually indicate that the dome is currently selected. Further, the selected non-programmable dome is logically connected to a pan, tilt and zoom (PTZ) keypad palette, which will be discussed later. The non-programmable dome icon 41 does not support the cone shaped pan/tilt direction icon 31PT, and therefore the pan and tilt directions are not visible on the graphical image.

A fixed camera icon 32 represents a fixed domed camera device or a wall mounted camera that is not capable of pan, tilt, zoom or focus control. Clicking on a fixed camera icon 32 results in the GCU 1 displaying the video from the fixed camera on the display unit 3. Upon being selected, the fixed camera icon 32A is highlighted and/or colored to visually indicate that the camera is currently selected. There are eight variations of this icon, each indicating a different viewing direction (north, east, west, south, southeast, southwest, northeast, northwest).

A target icon 40 represents a specific, static (fixed) view defined by one pan, tilt, zoom and focus position of a programmable dome 31. A pattern 40P icon represents a more general, dynamic (scanned) view that is defined by multiple pan, tilt, zoom and focus positions of a programmable dome. There are usually one or more critical areas within the viewing range of any CCTV camera device that can be represented as targets 40 or patterns 40P. Possible targets might include the plant entrance, the loading dock area, a cash register area or a jewelry display area. Possible patterns might include a parking lot, with the camera scanning each row of cars or a camera scanning along a fence line at a power plant.

In response to certain events, the operator needs to access targets or patterns quickly and accurately. Clicking on a target 40 or pattern icon 40P switches the video from the camera in the associated programmable dome to the display unit 3. It also "connects" the PTZ palette (which is to be discussed in greater detail later) to the dome (for control purposes) and commands the dome to go to the target or to run the pattern. To accomplish this task using systems currently available requires the operator to determine the address of the appropriate dome, enter the address in a keypad, recall the appropriate target number, then enter the target number in a keypad. Using the described icons, the operator can simply click on the icon that is shown at the desired location on the floor plan 30, without the need to know the dome address or target number.

An arrow 40AR is located within the pattern icon. The arrow 40AR indicates the general direction in which the camera will move. There are eight variations of the pattern icon, each indicating a different general direction (north, east, south, west, southeast, southwest, northeast, northwest).

Input icons 35–37 represent inputs from sensors 6. An input sensor 6 can be a simple (un-supervised) sensing device that provides a contact closure upon activation (such as a magnetic door switch or a passive infrared intrusion sensor). It can also be a more sophisticated (supervised) sensing device that detects opens, closures or impedance changes. A sensor 6 can be connected directly to the GCU 1 or can be connected to a dome or to a stand-alone input controller.

The door input icon 36 represents an intrusion sensing device and is displayed in three forms based on its status. The “Normal” state icon 36 (green with closed door) indicates that the device has not been tripped and is not currently active. The “Tripped+Active” state icon 36TA (red with open door) indicates that the device has been tripped and is currently active. The “Tripped+Not-Active” state icon 36TNA (red with closed door) indicates that the device has been tripped but is not currently active. Clicking on the “Normal” icon momentarily disables the alarm function and unlocks the door. After a short delay the door locks and the alarm is enabled. Clicking on the “Tripped+Not Active” icon 36TNA opens a text window, allowing the operator to enter a description of the alarm event. This clears the alarm event and changes the icon back to it’s “Normal” state 36.

The window input icon 37 represents an intrusion sensing device and is displayed in three forms based on its status. The “Normal” state icon 37 (green with closed window) indicates that the device has not been tripped and is not currently active. The “Tripped+Active” state icon 37TA (red with broken window) indicates that the device has been tripped and is currently active. The “Tripped+Not Active” state icon 37TNA (red with closed window) indicates that the device has been tripped but is not currently active. Clicking on the “Tripped+Not Active” icon 37TNA opens a text window, allowing the operator to enter a description of the alarm event. This clears the alarm event and changes the icon back to it’s “Normal” state 37.

The motion input icon 35 represents an intrusion sensing device (such as a motion detector) and is displayed in three forms based on its status. The “Normal” state icon 35 (green with standing man) indicates that the device has not been tripped and is not currently active. The “Tripped+Active” state icon 35TA (red with running man) indicates that the device has been tripped and is currently active. The “Tripped+Not Active” state icon 35TNA (red with standing man) indicates that the device has been tripped but is not currently active. Clicking on the “Tripped+Not Active” Icon 35TNA opens a text window, allowing the operator to enter a description of the alarm event. This clears the alarm event and changes the icon back to it’s “Normal” state 35.

A card reader icon 33 represents an access control device that electronically “reads” an identification card (not shown) to allow or deny access to a protected premises or to an area within a protected premises. The card reader icon 33 represents an access control card reader and is displayed in two forms based on its status. The “Normal” state (green) icon 33 indicates that the device has no exception events pending. The “Tripped” state (red) icon 33T indicates that the device has an exception event pending. An example of an exception is someone trying to gain access to an unauthorized area or someone trying to use a card that has been reported lost or stolen. Clicking on the “Tripped” icon 33T opens a text window, allowing the operator to enter a description of the exception event. This clears the exception event and changes the icon back to it’s “Normal” state 33.

An output icon 38 represents an output device 5. For example, an output icon 38 can represent indoor or outdoor lighting that can be turned on or off, entrances to buildings or gates to parking areas that can be opened or closed. It can also represent audible alarm devices such as bells or sirens, speakers and microphones that can be made active or inactive, or any of a number of other devices. The output icon 38 is displayed in two forms based on its status. The “Off” state icon 38 indicates that the output device 5 is closed, off or otherwise inactive. The “On” state icon 38A indicates that the output device 5 is open, on or otherwise active.

The phone icon 39 represents a physical phone that can be called by the operator. Clicking on a phone icon 39 shown in a specific office on the floor plan 30 produces audible tones representing the number of that phone. A simple connection between the workstation audio output and the phone enables the workstation to “dial” the number. This frees the operator from having to look-up the phone number. Double-clicking on the phone icon 39 results in the phone number being displayed on the screen. The phone icon 39 can be displayed in two forms based on its status. The “Normal” state icon 39 indicates a non-emergency phone being used for normal purposes. The “Alarmed” (red) state icon 39A indicates a special emergency phone, such as a phone located in an airport parking lot, that is currently active. This allows the operator to determine the location of the phone in the parking lot so that he can dispatch help or assistance.

FIGS. 6–10 are illustrations of control palettes. A control palette is a special type of window that is superimposed above the floor plan 30 and that can be positioned anywhere on the screen of the display unit 3. Typically a control palette contains buttons that, when pressed or clicked on (using the mouse), result in the GCU 1 controlling a physical device.

Figure 6:
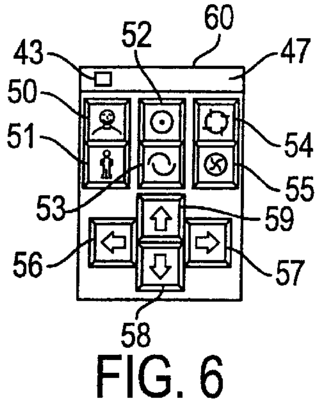
FIG. 6 shows a pan, tilt and zoom (PTZ) palette generated by the GCU for controlling domes and pan/tilt cameras.

FIG. 6 shows a pan, tilt and zoom (PTZ) Palette 60 which allows the operator to control the pan, tilt, zoom, focus, and iris functions of a selected dome by “pressing” on-screen buttons (for example, by positioning a pointing icon 34 over the desired on-screen button and pressing the mouse button). This causes the GCU 1 to send a digital control signal to the selected dome, activating the desired control function. In more detail, to control the lens functions, the pointing icon 34 is positioned over the zoom in 50, zoom out 51, focus near 52, focus far 53, iris open 54 or iris close 55 on-screen button, and then the mouse button is pressed and held for as long as the particular function is desired. To pan or tilt the camera, the pointing icon 34 is positioned over the pan left 56, pan right 57, tilt down 58 or tilt up 59 button, and then the mouse button is pressed and held. Releasing the mouse button stops the operation. The pan 56 and 57 and tilt buttons 58 and 59 provide for variable speed panning and tilting. By way of example, pressing the mouse button while the pointing icon 34 is directly on the pan left 56 button causes the dome to pan left at a relatively slow speed. By sliding the pointing icon 34 slightly to the left of the pan left 56 button, the panning speed is increased. Sliding the pointing icon 34 back to the right decreases the panning speed.

Figure 7:
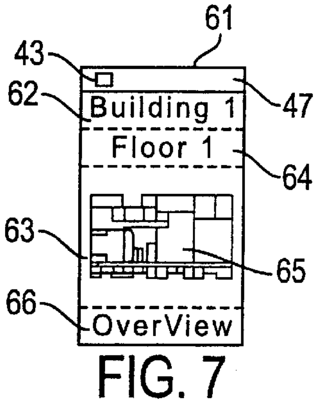
FIG. 7 shows a map palette generated by the GCU for controlling the graphical floor plan image.

FIG. 7 shows a map palette 61 which allows the operator to select the desired building, floor and viewing area of the facility floor plan. The building menu 62 is a pull down menu that allows the operator to select a specific building by name. The floor menu 64 allows the operator to select a specific floor within the currently selected building. A small scale floor plan of the selected building and floor is displayed in the Mini Map area 65. Clicking the mouse button over the mini map 65 will cause a view area rectangle 63 to be displayed over the mini map 65. Moving the position of the view area rectangle 63 relative to the mini map 65 causes the area located within the view area rectangle 63 to be displayed as the full size floor plan 30. Clicking on the overview button 66 causes a smaller scale version of the floor plan to be displayed.

Figure 8:
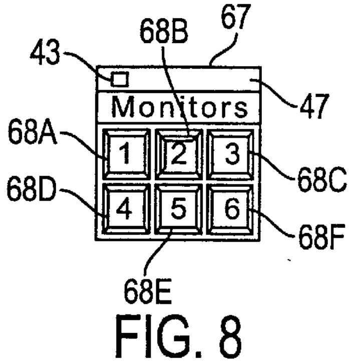
FIG. 8 shows a monitor palette generated by the GCU for selectively activating and deactivating monitors.

FIG. 8 shows a monitor palette which allows the operator to select which monitors of the display 3 are to be activated. To activate a monitor, the pointing icon 34 is positioned over one of the on-screen monitor buttons 68A–68F and the mouse is clicked. Subsequent selections of domes or cameras will be displayed on the activated monitor. In FIG. 8, the monitor 2 68B button is shown depressed or "activated".

Figure 9:
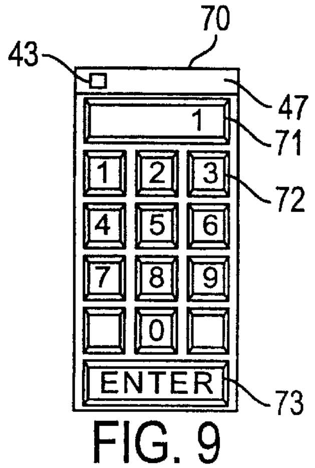
FIG. 9 shows a keypad palette generated by the GCU as an alternate means for selecting cameras.

FIG. 9 shows a keypad palette 70 which provides an alternate way for the operator to select a dome when the dome number is known (as opposed to clicking on a dome icon shown on the floor plan 30 of the facility). The dome number is reflected in the numeric display 71 area as the number keys 72 are selected. Clicking on the ENTER key 73 calls-up the dome only if the dome exists in the system. If it doesn't, a beep is sounded, the numeric display 71 reverts to the previously selected dome number and no video switch takes place. The numeric display 71 also reflects the number of a dome selected using the dome icons on the floor plan.

Figure 10:
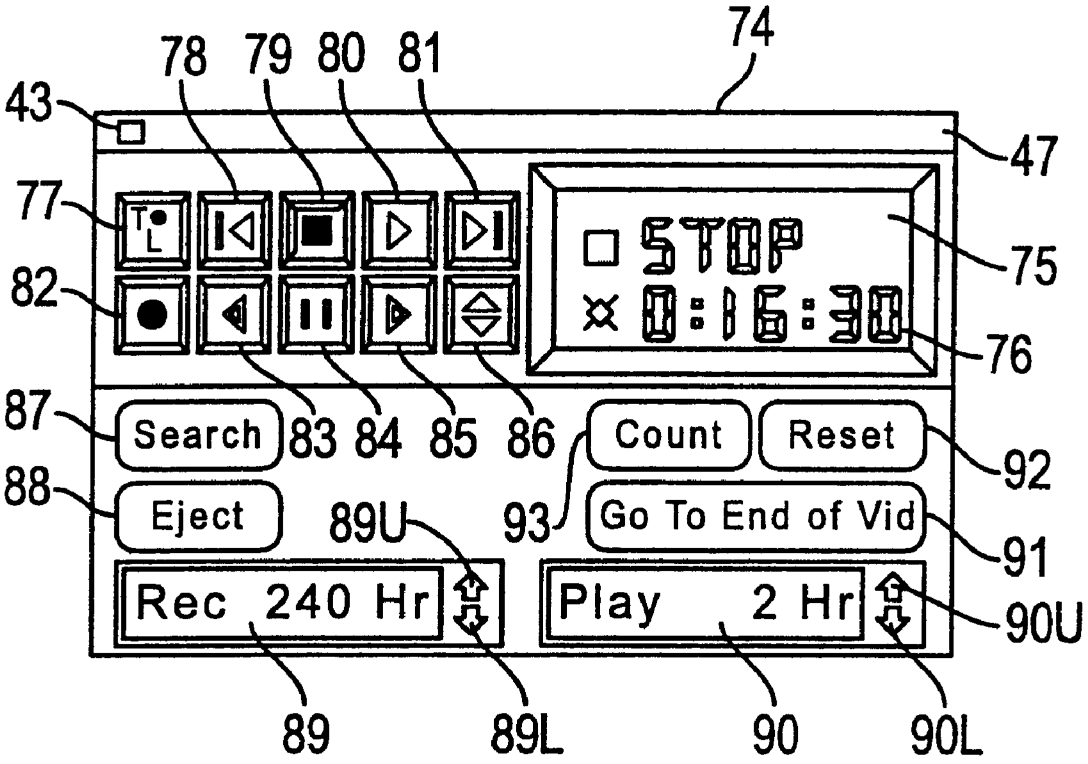
FIG. 10 shows a VCR palette generated by the GCU for controlling VCR's.

FIG. 10 shows a VCR palette 74 which allows the operator to control one or more time-lapse or standard VCRs by clicking on on-screen buttons 77–93 representing the VCR functions. This function is available only for VCRs equipped with a communications port that allow them to be controlled by the GCU 1. In a VCR so equipped, it is typical that any function that is available on the front panel of the VCR is also available through the communications port. This represents a significant benefit to the operator. There may be several VCRs being used in a CCTV system (for example, in a Casino there can be 50 or more VCRs). Using current systems, the operator must control each VCR from its own front panel. Using the VCR palette 74, the operator can simply click on an on-screen button 77–93 that controls the desired VCR function, without the need to physically go to the VCR. A second benefit is the ability of the GCU 1 to automatically control the VCR in response to specific system events, such as alarms or pre-scheduled events. A third benefit, and perhaps the most important, is the ability of the system to automatically create a log of the recorded video segments. The log entry includes the time and date, a description of the triggering event and an index number related to the location of the video segment on the actual VCR tape. This provides a "search" capability that allows the system to quickly locate and queue-up recorded events for review.

The function of each on-screen button 77–93 of the VCR palette is as follows. Button 77 turns on a time lapse recording mode which records in a selected time lapse mode. Button 82 turns on a real time recording mode which records in a two hour mode. Button 78 is a rewind button which rewinds the tape towards the beginning of the tape. Button 83 is a frame reverse button, which when in the pause mode steps the video tape back one frame. Button 79 stops the tape. Button 84 pauses the video, and when in the play mode, displays the current video frame on the display 75. Button 80 is a play button which shows the video in the play time lapse mode selected by the play time lapse button 90. Button 85 is a frame forward button, which when in the pause mode steps the video tape forward one frame. Button 81 is a fast forward button which forwards the tape towards the end of the tape. Button 86, when selected displays additional VCR controls. The search button 87 initiates searching based upon a hour/minute/second format. The eject button 88 ejects the current tape. The count button 93 updates the tape count 76 of the display 75 to reflect the current VCR tape count. The reset button 92 resets the tape count 76 to "0000". The record time lapse select button 89 increases or decreases the record time mode depending upon whether an upper arrow 89U or a lower arrow 89L is selected. Similarly, the play time lapse select button 90 increases or decreases the play time mode depending upon whether an upper arrow 90U or a lower arrow 90L is selected.

FIGS. 11–19 are illustrations of various types of programming windows. Generally, a programming window is a special type of window superimposed on the floor plan and that can be positioned anywhere on the screen of the display unit 3. Typically it contains buttons, tools and information that allows an operator to install and program a physical device such as a programmable dome. It contains icons representing the device or device function that can be "picked-up and placed" at a specific location on the floor plan. It also allows the operator to program system functions such as Sequences, Zones, Alarm Inputs, Alarm Clock Events, etc.

Figure 11:
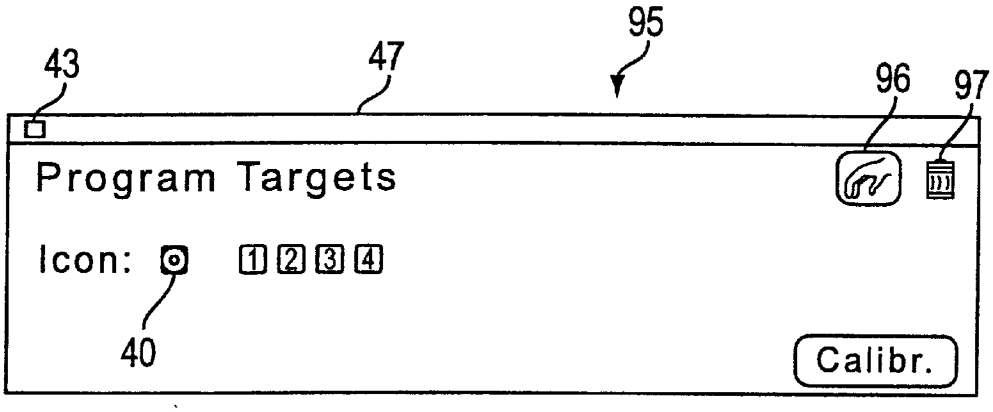
FIG. 11 shows a program target window generated by the GCU for adding target icons to the graphical image.

FIG. 11 is a program target window 95 for defining a specific static (fixed) view defined by pan, tilt, zoom and focus positions of a dome camera. Examples of possible targets might include the plant entrance, the loading dock area, a cash register area or a jewelry display area.

The program target window 95 contains the tools that allow the operator to select a target icon 40 and physically place it in the desired location on the floor plan 30. To program a target, the operator selects the floor plan 30 that contains the programmable dome to be programmed, and selects the dome by clicking on its associated icon 31A (the video from the selected dome will appear on the screen of the display unit 3). The operator next uses the pan, tilt, zoom and focus controls of the PTZ palette 60, shown in FIG. 6, to adjust the field of view of the dome to a desired viewing state.

To place a target icon 40 on the floor plan 30, the operator selects the mover tool 96 located in the upper right portion of the window by clicking on it. Using the mouse, the operator positions the tool hand 96 over the target icon 40, found in the program target window 95, and then clicks and holds the mouse button. This action picks up the target icon 40. The operator, while still holding the mouse button down, moves the target icon 40 to the location on the floor plan 30 that corresponds to the location currently being shot by the selected dome and then releases the mouse button. This action "places" the target icon 40 on the floor plan and programs the selected dome with the current pan, tilt, zoom and focus settings. Thereafter, each time that particular target icon 40 is selected, the GCU 1 sends a control message to the dome which causes the dome to assume the above mentioned pan, tilt, zoom and focus settings.

To move a target icon 40 to another location on a floor plan 30, the operator again selects the mover tool 96 by clicking on it. Using the mouse, the operator positions the mover tool 96 above the desired target icon 40 on the floor plan and clicks and holds the mouse button. This action picks up the target icon 40. The operator, while still holding the mouse button down, moves the target icon 40 to the location on the floor plan 30 that reflects the desired location of the target and then releases the mouse button. This action places the target icon 40 on the floor plan 30.

To remove a target icon 40 from the floor plan 30, the operator selects the target icon 40 as described above, but releases the mouse button while the target icon 40 is positioned above the small trash can icon 97 located in the upper right portion of the program target window 95. This action removes the target icon 40 from the floor plan.

Figure 12:
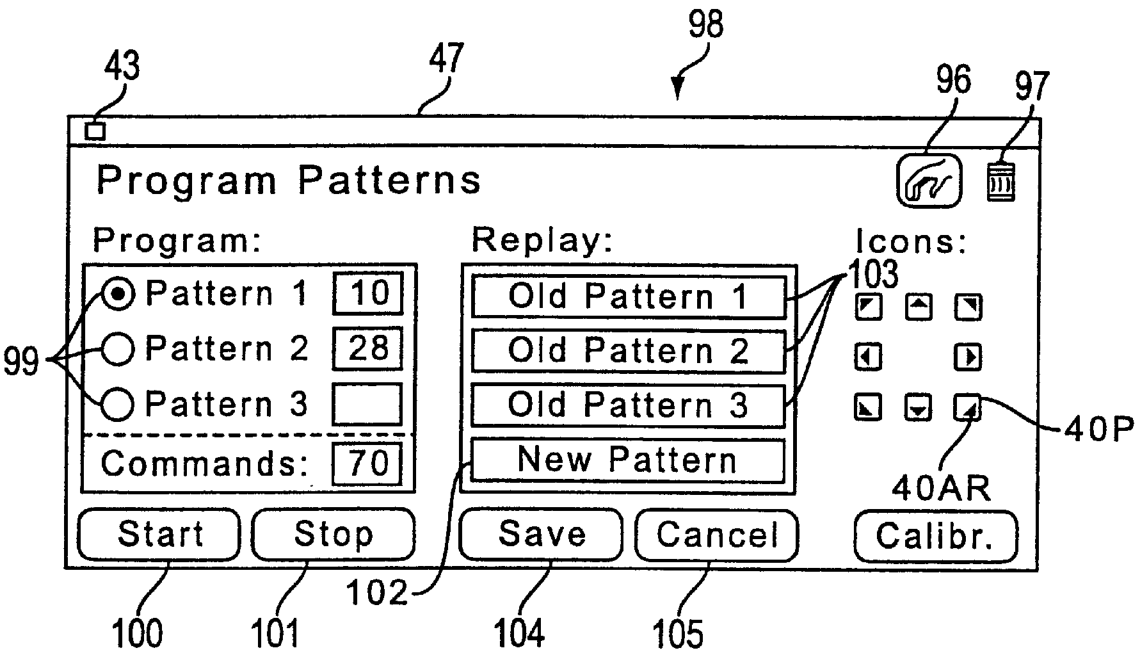
FIG. 12 shows a program pattern window generated by the GCU for adding pattern icons to the graphical image.

FIG. 12 shows a program pattern window 98 which contains the tools that allows the operator to select a pattern icon and physically place it in the desired location on the floor plan. A pattern is a general dynamic (scanned) view that is defined by multiple pan, tilt, zoom and focus positions. An example where patterns are useful is a parking lot, where the pattern causes the camera to scan each row of cars, or where a second pattern causes a camera to scan along a fence line.

To program a pattern, the operator selects the floor plan 30 that contains the programmable dome he wishes to program, and selects the dome by clicking on its programmable dome icon 31 (the video from the dome will appear on the currently selected monitor). The operator next selects the pattern number 99 of the pattern he wishes to program and uses the pan, tilt, zoom and focus controls to position the dome-to the view that defines the starting point of the desired pattern. To program the pattern, the operator clicks on the start button 100 and then uses the pan, tilt, zoom and focus controls of the PTZ palette 60 (FIG. 6) to reflect the desired movement of the dome, including any dwell time between dome movements. When the pattern is complete, the operator clicks on the stop button 101. This action saves the pattern as a new pattern 102, allowing the operator to compare, for example, the old pattern 103 with the potential new pattern 102. If he likes the new version, he clicks on the save button 104, which replaces the old pattern 103 with the new pattern 102. If he likes the old version, he clicks on the cancel button 105.

To place the pattern icon 40P on the floor plan, the operator selects the mover tool 96 by clicking on it. Using the mouse, the operator positions the mover tool 96 above the desired pattern icon 40P found on the window 98 (i.e., the icon with the arrow 40AR depicting the general direction of the pattern), then clicks and holds the mouse button. This action picks up the pattern icon 40P. The operator, while still holding the mouse button down, moves the mouse pattern icon 40P over the location on the floor plan 30 that reflects the desired location of the pattern icon 40P and then releases the mouse button. This action places the pattern icon 40P on the floor plan 30 in relation to dome and programs the selected dome with the pattern record.

To move a pattern icon 4QP to another location on a floor plan 30, the operator again selects the mover tool 96 by clicking on it. Using the mouse, the operator positions the mover hand 96 above the pattern icon 40P to be moved and clicks and holds the mouse button. This action picks up the pattern icon 40P. The operator, while still holding the mouse button down, moves the mouse so that the pattern icon 40P is positioned at a location on the floor plan 30 that reflects the desired new location of the pattern icon 40P and then releases the mouse button. This action places the pattern icon 40P on the floor plan 30.

To remove a pattern icon 40P from the floor plan 30, the operator selects the pattern icon 40P as described above, but releases the mouse button while the pattern icon 40P is positioned above the small trash can icon 97 which is located in the upper right portion of the program pattern window 98. This action removes the pattern icon from the floor plan.

As discussed with reference FIG. 1, various sensors 6 are connected to the GCU 1. The sensors 6 can be simple (unsupervised) sensing devices that provide a contact closure upon activation (such as a magnetic door switch or a passive IR intrusion sensor), or they can be more sophisticated (supervised) devices that detect opens, closures or impedance changes. While in FIG. 1 the sensors 6 are shown as connected directly to the GCU 1, the sensors can also be connected through to a dome or stand-alone input controller to the GCU 1.

Figure 13:
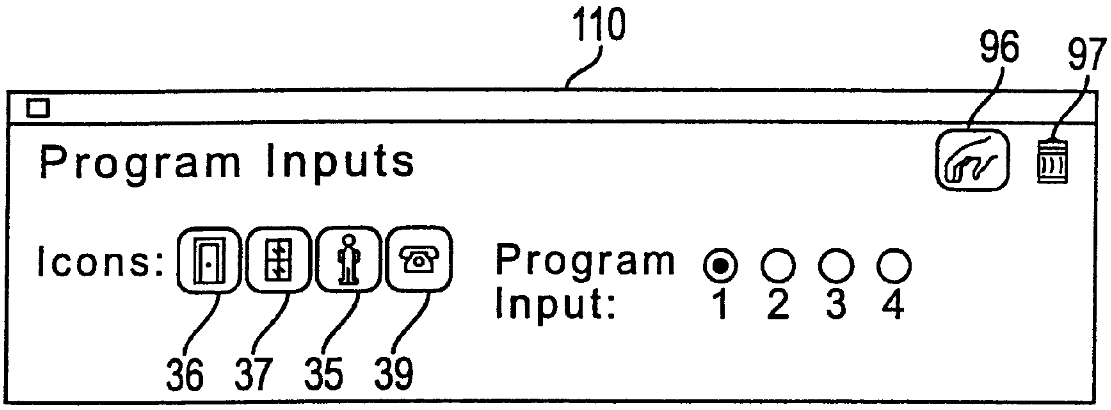
FIG. 13 shows a program inputs window generated by the GCU for adding input icons to the graphical image.

FIG. 13 shows a program inputs window 110, as it appears on the screen of the display unit 3, which allows the operator to select an input icon 35, 36, 37, 39 representing a specific physical input sensor 6. To place an input icon, for example a door icon 36, on the floor plan 30, the operator selects the mover tool 96 located in the upper right portion of the program input window 110 by clicking on it. Using the mouse, the operator positions the mover hand 96 above the door icon 36, then clicks and holds the mouse button. This action "picks up" the door icon 36. The operator, while still holding the mouse button down, moves the door icon 36 over the location on the floor plan 30 that reflects the location of the door sensor and then releases the mouse button. This action places the door icon 36 on the floor plan 30.

Continuing with the door icon 36 as the example, to move the door input icon 36 to another location on a floor plan 30, the operator again selects the mover tool 96. Using the mouse, the operator positions the mover hand 96 above the desired door icon 36, then clicks and holds the mouse button. This action picks up the door icon 36. The operator, while still holding the mouse button down, moves the door icon 36 over the location on the floor plan 30 that reflects the new location of the door sensor and then releases the mouse button. This action places the door icon 36 on the floor plan 30.

To remove an input icon, such as a door icon 36, from the floor plan 30, the operator selects the door icon 36 as described above, but releases the mouse button while the door icon 36 is positioned above the small trash can icon 97 located in the upper right portion of the program input window 110. This action removes the particular door icon 36 from the floor plan 30 and cancels all the records associated with that particular door sensor.

Figure 14:
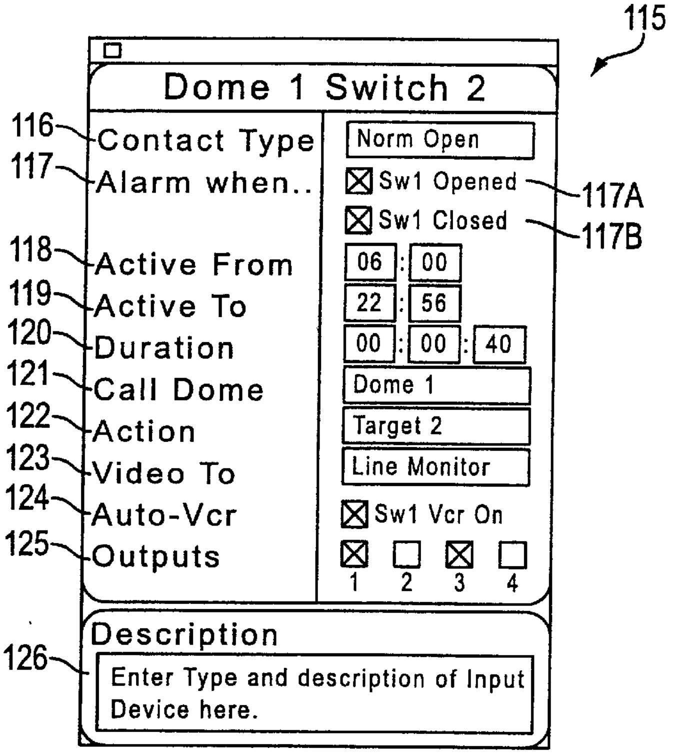
FIGS. 14 and 15 show program alarm windows generated by the GCU for assigning attributes to input sensor devices.

After a sensor 6 is assigned an input icon 35–37, 39, and the input icon is placed on the floor plan 30, the GCU 1 must be configured to provide the desired response to various signals received from the sensors 6. In more detail, FIG. 14 shows a program alarms window 115, as displayed on the screen of the display unit 3, which allows the operator to configure the way the GCU 1 will react to the inputs from the sensors 6. The GCU 1 can react in many ways including, calling-up a specific camera or dome, calling-up a target or pattern associated with a programmable dome, displaying the video on a specific monitor, turning on a VCR to record the event, turning on a specific output (i.e., to turn on the lights in the warehouse), sounding an audible alarm, giving explicit instructions to the operator and logging a description of the event on a printer.

Shown in FIG. 14 is a program alarms window 115 which is used to select the desired alarm attributes for the sensors 6. Attribute fields 116–125 are selected by moving the pointing icon 34 over the desired attribute field and then clicking the mouse. The setting of the alarm when field 117 determines the state in which the sensor 6 is considered to be in alarm. Clicking on the SW1 Open 117A or the SW1 Closed 117B fields selects respectively, alarm when sensor "opened" and alarm when sensor "closed" characteristics and places an "x" in the respective field. To remove such characteristics, the mouse is clicked a second time in the desired field 117A or 117B, and the "x" is removed. Similarly, the state of the auto-VCR 124 field is toggled by clicking the mouse. When selected, as indicated by an "x" in its field, a VCR 4 is turned on when an alarm condition is initiated by the sensor 6. The outputs 125 field has four fields corresponding to a first through fourth output device 5. Clicking on a field corresponding to an output device results in an "x" being placed in that field and configures the GCU 1 to turn on that particular output device 5 when an alarm is initiated. Clicking a second time on the field removes the "x" and configures the GCU 1 to not turn on that particular output during an alarm.

Figure 15:
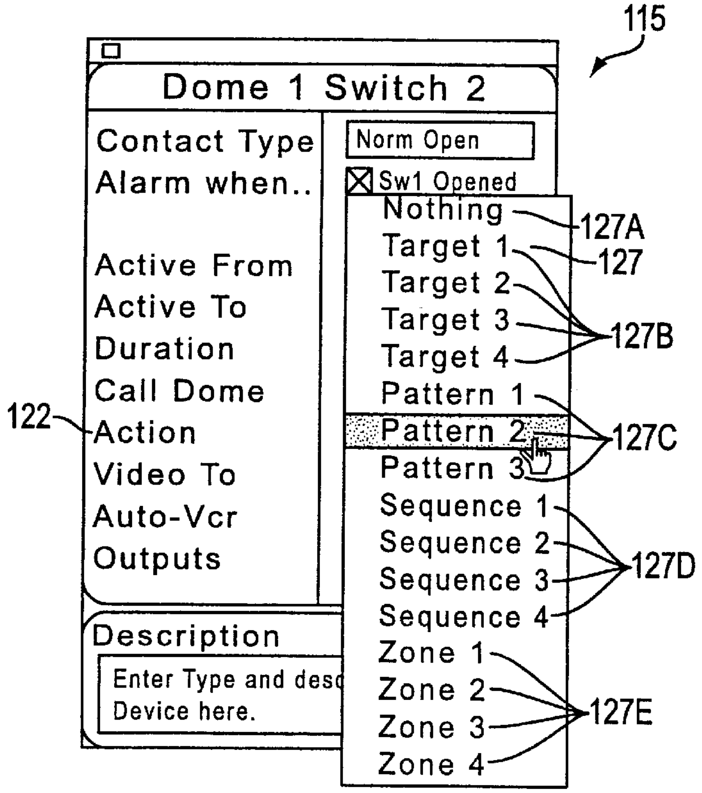

Clicking on any of the remaining fields 116, 118–123 causes a pulldown menu, containing selectable options regarding the selected field, to be displayed. FIG. 15 shows a pull down menu 127 that is displayed when the action field 122 is clicked. The pull down menu 127 contains various action options 127A–127E corresponding to action to be taken when an alarm is initiated. The particular action option selected is then displayed in the Action field 122. For example, if a target 127B or pattern 127C action option is selected by clicking thereon, when an alarm occurs, the GCU 1 initiates the same action as if the operator manually clicked on a target 40 or pattern 40P icon displayed on the floor plan 30. Further, a sequence 127D or a zone 12E option could also be selected.

For the contact type 116 field the pop down menu contains various types of contact. The active from field 118 and the active to field 119 contain a beginning and ending time of a period in which the GCU 1 initiates alarms for the particular sensor. The duration field 120 contains the duration of time that the alarm will last. The call dome field 121 contains the number of a dome whose video will be switched to the selected monitor during an alarm. The video to field 123 contains the monitor number which will display the video signals during an alarm. Finally, the description 126 field permits entry of text describing the type and description of the particular sensor 6.

As discussed above with respect to the action field 122, a zone 127E can be initiated by the GCU 1 when a sensor 6 initiates an alarm. A zone is a system function that simultaneously directs multiple domes to pre-programmed targets. The operator can specify the desired dome numbers and target numbers. The benefit of the zone feature is that an operator can quickly direct several domes to critical targets, such as all the exits of a building, or all the cash register areas in a store. Zones can be initiated manually by the operator, or automatically in response to an alarm initiated by a sensor 6.

Figure 16:
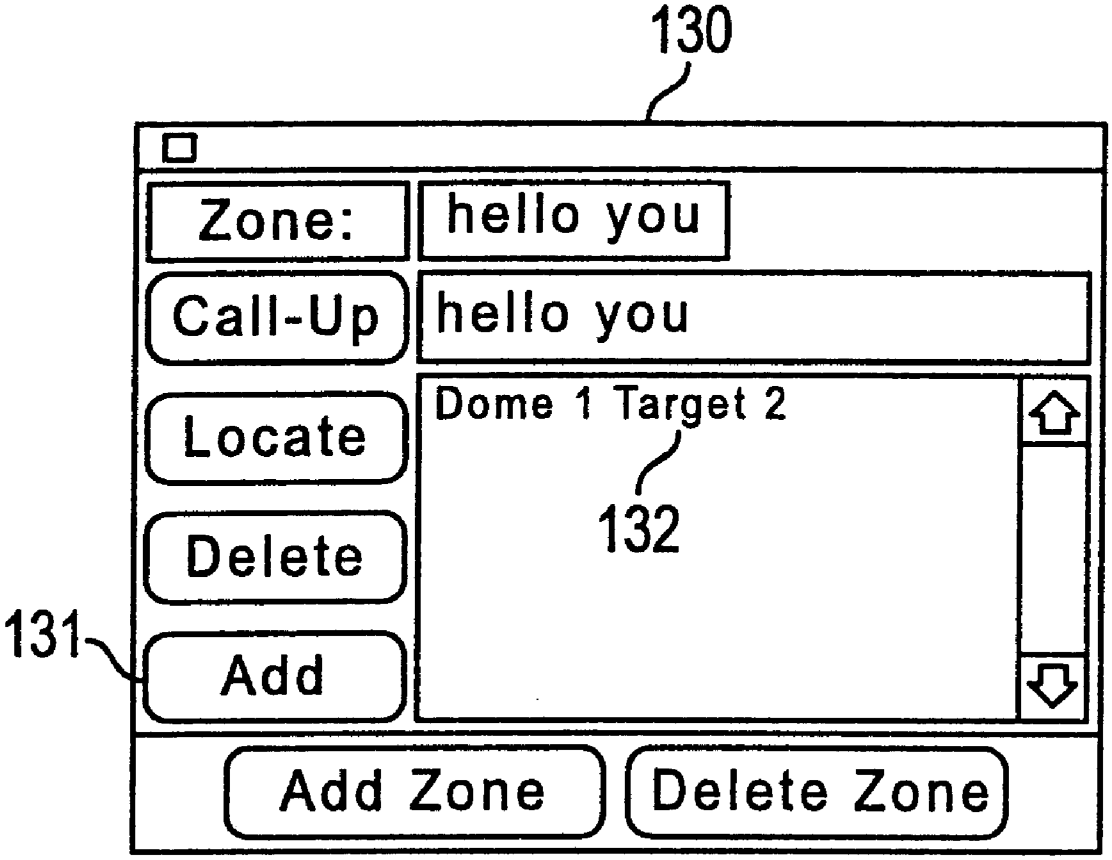
FIG. 16 shows a program zone window generated by the GCU for assigning zones.

The program zones window 130, shown in FIG. 16, allows the operator to create a new zone, delete an existing zone and edit the name of a zone. In addition, the operator can add a target 40 to the zone list 132, delete a target 40 from the zone list, identify the location of a particular dome icon 31 on the floor plan, and call-up the target on the current monitor.

To add targets 40 to the zone list 132, the operator first clicks on the add button 131, which becomes highlighted. He next clicks on the desired target icons 40 on the floor plans 30, which are automatically added to the list. When complete, the operator again clicks on the add button 131, which becomes un-highlighted.

As also discussed above with respect to the action 122 field, a sequence 127D can be initiated by the GCU 1 when a sensor 6 initiates an alarm. In more detail, a sequence is a system function that sequentially steps through a list of cameras or domes 7, displaying video from each camera in turn on a single monitor. The operator can specify the desired camera or dome number, a target 40 or pattern 40P (if the dome is programmable), a dwell time (in hours, minutes and seconds), and a "bypass" field (to temporarily remove the dome from the sequence). A sequence can be called-up manually by the operator, or automatically by the system in response to an "alarm" event or scheduled "clock" event. The benefit of this feature is that an operator can direct the system to automatically display the video of several domes (including targets or patterns) in a sequence that can cycle indefinitely.

Adding a dome or camera to the sequence list is similar to adding targets to a zone (described above with reference to FIG. 16) with an additional requirement being the entering of a dwell time (the viewing time) for each dome or camera.

Figure 17:
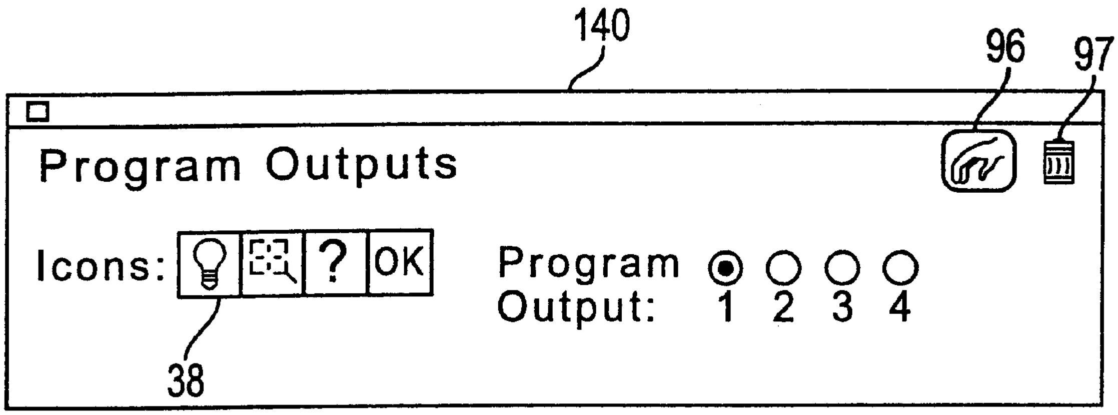
FIG. 17 shows a program output window generated by the GCU for adding output icons to the graphical image.

FIG. 17 shows an output program window 140, as displayed on the screen of the display unit 3, which allows the operator to select output devices. The GCU 1 initiates output signals that control output devices 6. For example, an output device 6 can control indoor or outdoor lighting that can be turned on or off, entrances to buildings or gates to parking areas that can be opened or closed, audible alarm devices such as bells or sirens, speakers and microphones that can be made active or inactive, or any of a number of other functions. An output can be generated by a dome or by a stand-alone output controller.

The program outputs window 140 allows the operator to select an output icon 38 representing a specific physical output device. To place an output icon 38 on the floor plan 30, the operator selects the mover tool 96 in the upper right portion of the program output window 140 by clicking on it. Using the mouse, the operator positions the mover tool 96 above the desired output icon 38, then clicks and holds the mouse button. This action "picks up" the output icon 38. The operator, while still holding the mouse button down, moves the output icon 38 over the location on the floor plan 30 that reflects the location of the output device 5 and then releases the mouse button. This action places the output icon 38 on the floor plan 30. To move an output icon 38 to another location on a floor plan 30, the operator again selects the mover tool 96. Using the mouse, the operator positions the mover hand 96 above the desired output icon 38 on the floor plan 30 and then clicks and holds the mouse button. This action "picks up" the output icon 38. The operator, while still holding the mouse button down, moves the selected output icon 38 over the location on the floor plan 30 that reflects the new location of the output device 6 and then releases the mouse button. This action places the output icon 38 on the floor plan 30.

To remove an output icon 38 from the floor plan 30, the operator selects the output icon 38 as described above, but releases the mouse button while the output icon 38 is positioned above the small trash can icon 97 located in the upper right portion of the program input window 140. This action removes the output icon 38 from the floor plan and cancels the record of the output.

Installing a dome or camera involves two distinct activities; the installation of the physical dome 7 and the installation of a dome icon 31 representing the dome on the floor plan 30 generated by the GCU 1.

As discussed previously, there are three types of domes supported by the CCTV video interface 17 shown in FIG. 2; the programmable dome (icon 31), the non-programmable dome (icon 41) and the fixed dome (or fixed camera) (icon 32).

Figure 18:
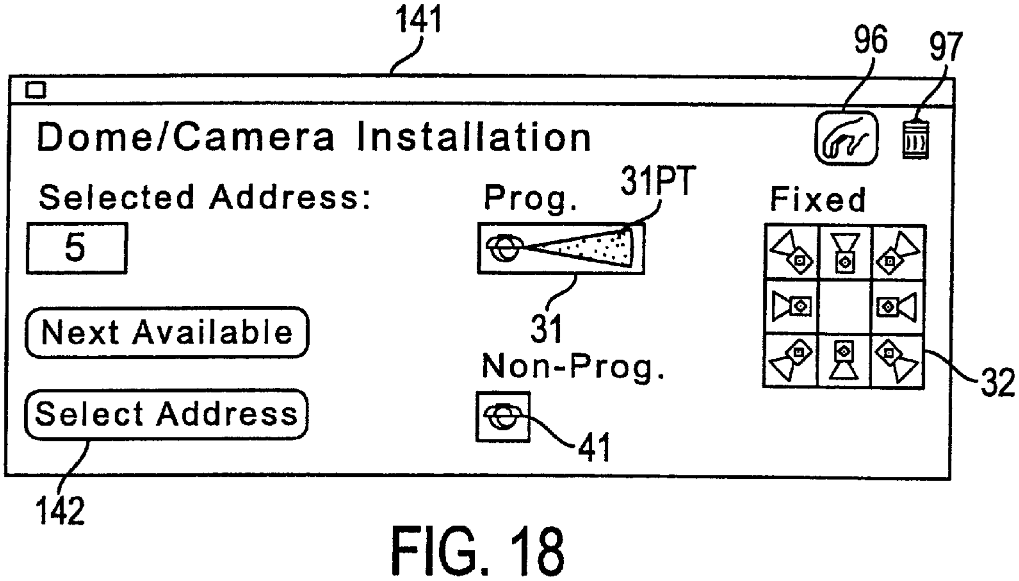
FIG. 18 shows a program dome/camera window generated by the GCU for adding dome/camera icons to the graphical image.

A programmable dome is an enhanced CCTV domed camera device that is capable of 360° pan, 90° tilt, zoom and focus control, and has the ability to electronically determine it's pan, tilt, zoom and focus position. A non-programmable dome is a standard CCTV domed camera device capable of 360° pan, 90° tilt, zoom and focus control. A fixed camera is a fixed domed camera device or a wall mounted camera that is not capable of pan, tilt, zoom or focus control. displayed on in FIG. 18 is a dome installation window 141, as displayed on the screen of the display unit 2, which allows the operator to select a icon 31, 41, 32 representing the programmable dome, the non-programmable dome and the fixed camera, respectively. The programmable dome icon consists of a dome graphic with a cone shaped extension 31PT (indicating its current pan and tilt viewing direction). The non-programmable dome icon 41 is a dome graphic only. The fixed dome (or camera) icon 32 includes eight camera graphics, each indicating a different viewing direction.

Figure 19:
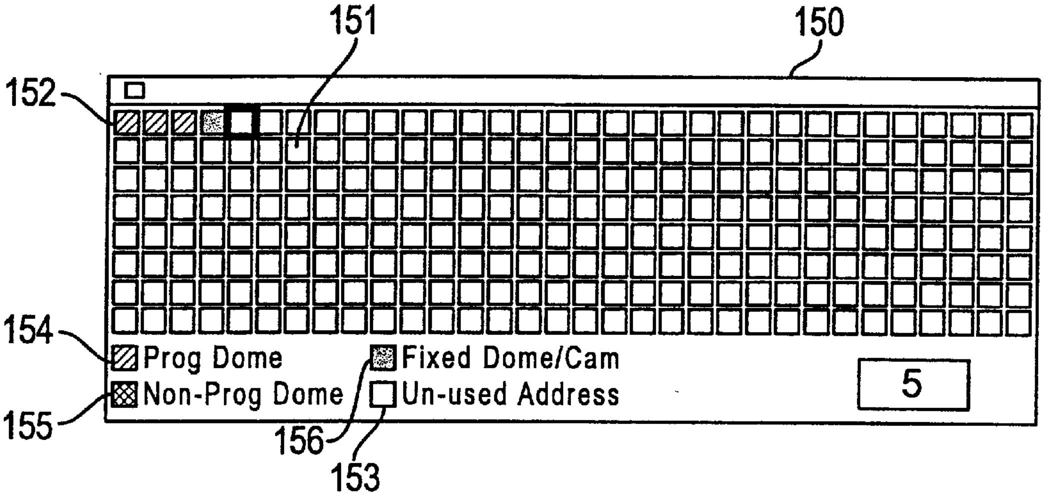
FIG. 19 shows a dome address picking window generated by the GCU for altering the address of domes/cameras being added to the graphical image.

The address assigned to a new dome or camera is normally set to be the next available (unused) address. However, the operator can over-ride the assigned address by clicking on the select address button 142 which results in an address picker window 150, as shown in FIG. 19, being displayed. The address picker window 150 contains a matrix of square boxes 151 representing all dome addresses. Address #one 152 is in the upper left hand corner with address #two immediately to the right of address number one. Unused addresses are indicated by a white or empty box 153. Blue address boxes 154 indicate a programmable dome. Green address boxes 155 indicate a non-programmable dome. Yellow address boxes 156 indicate a fixed dome. To select a specific address, the operator clicks on a white box representing the desired address (the address box selected is framed in a red rectangle and its number is displayed in the lower right hand corner).

Referring now to FIG. 18, to place a dome or camera icon 31, 41, 32 on the floor plan 30, the operator selects the mover tool 96 by clicking on it. Using the mouse, the operator positions the mover tool 96 above the desired icon 31, 32 or 41 then clicks and holds the mouse button. This action picks up the icon. The operator, while still holding the mouse button down, moves the desired icon over the location on the floor plan 30 that reflects the location of the dome or camera, then releases the mouse button. This action places the icon 31, 32 or 41 on the floor plan 30.

The removing or moving of a dome or camera icon 31, 32 or 41 is similar to the removing or moving of an output icon 38 as describe with reference to FIG. 17, and therefore will not be repeated.

FIGS. 20–24 are illustrations of various types of information windows which, when selected, appear on the screen of the display unit 3. Generally, an information window is a especial type of window that appears to float above the floor plan and that can be positioned anywhere on the screen. It can contain information about a physical device or device function, such as, for example, a camera 7, a sensor 6, a target 40 or a pattern 40P. It can contain information about system activities in the form of "logs". It can also contain system Help information.

Figure 20:
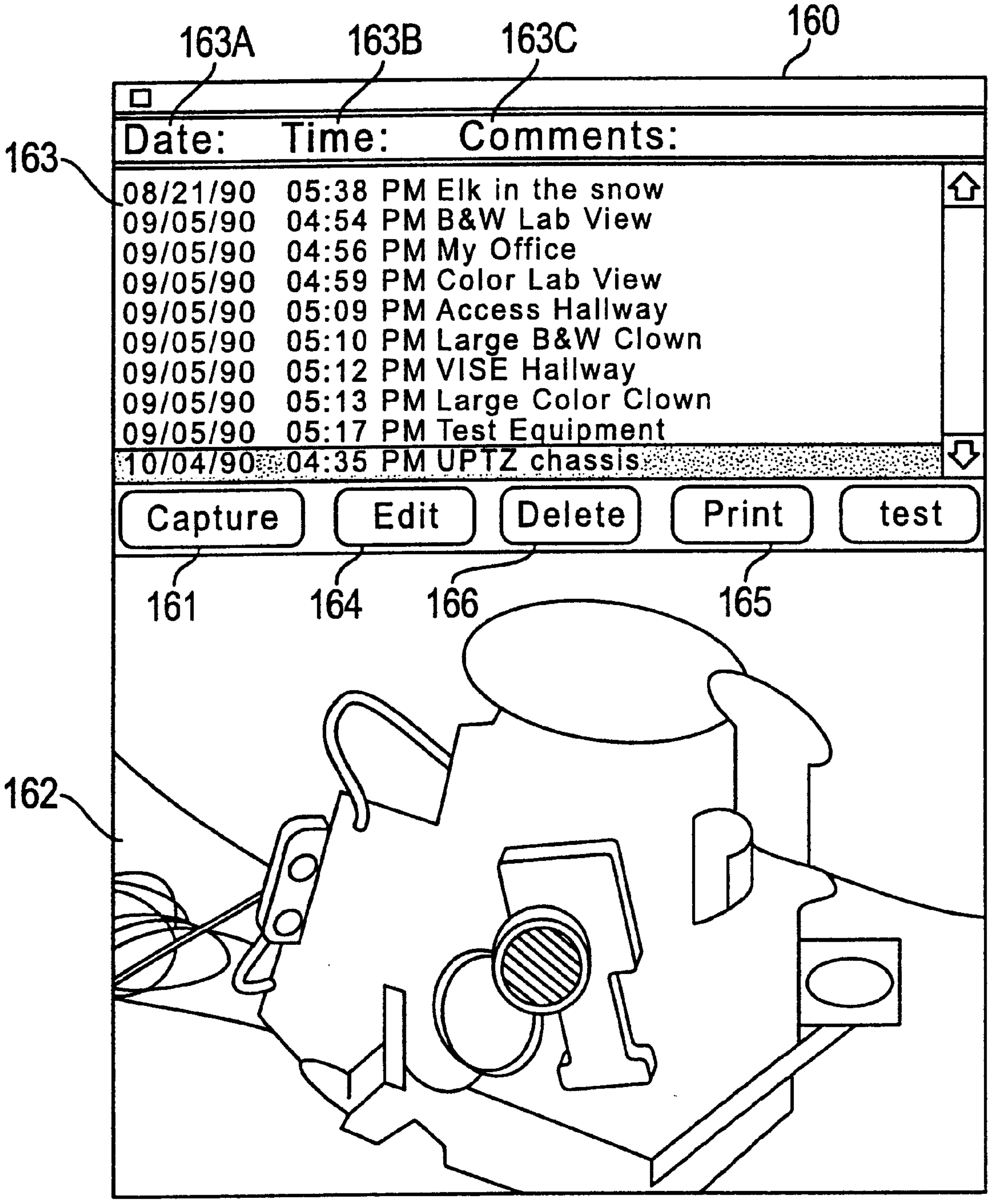
FIG. 20 shows a picture log information window generated by the GCU for displaying a list of pictures stored in a database.

FIG. 20 shows a picture log information window 160 that contains a database of "captured" video frames or images. This feature requires use of the video capture 16 circuit which was discussed previously with reference to FIG. 2. To "capture" an image and add it to the database, the operator simply clicks on the capture button 161. This causes the processor 10 to instruct the video capture 16 circuit to digitize the current video frame being received from a camera 7, and stores the digitized image in the memory unit 13. The digitized image is then displayed within a picture portion 162 of the picture log information window 160, and an entry is automatically made in a log 163. The logged information consists of the date 163A, time 163B, and a descriptive comment 163C that can be edited by the operator.

To view a previously captured image 162, the operator can click on the line in the log 163 representing the desired image, and the image will appear in the picture portion 162 of the window 160. The operator can now delete the image and its log entry by clicking on the delete button 165. A hard copy printout of the image can be obtained, provided a printer is attached to the GCU 1, by clicking on the print button 166.

Figure 21:
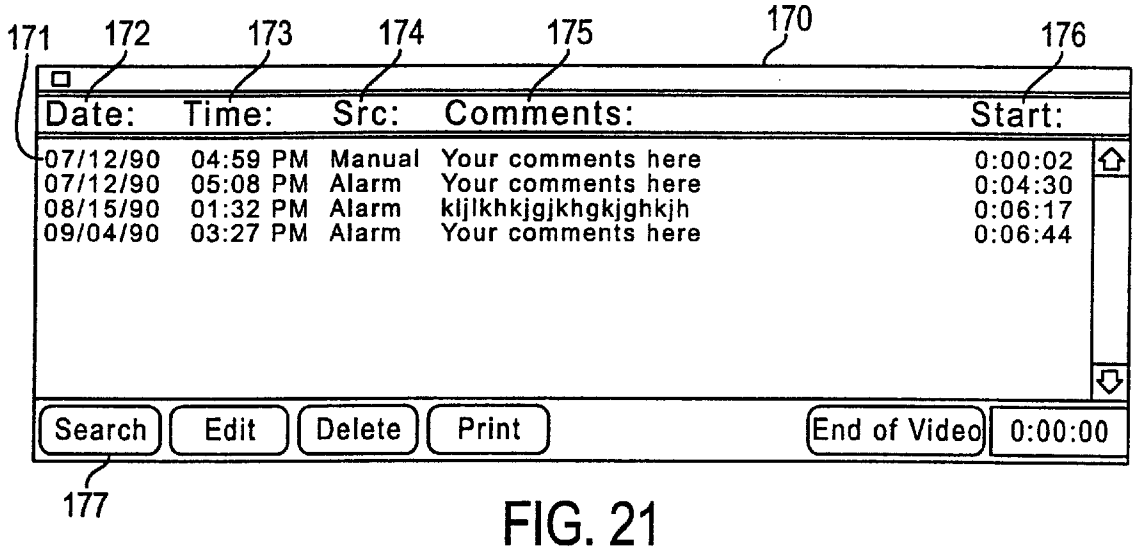
FIG. 21 illustrates a video log information window 170 generated by the GCU that shows a chronological list of the VCR's activity.

FIG. 21 shows a video log information window 170 that contains a chronological list 171 reflecting the activity of a VCR. This capability requires the use of VCRs equipped with communications ports that allow them to be controlled by the GCU 1. The logged information 171 consists of the date 172, the time 173, the triggering source of the event 174, a descriptive comment 175 (that can be edited by the operator), and the start count 176 (an index indicating the location of the video segment on the VCR tape). The triggering source 174 can be an operator clicking on the record button 77 of the VCR palette 74 (see FIG. 10), or the system responding automatically to an alarm event or clock event.

Figure 22:
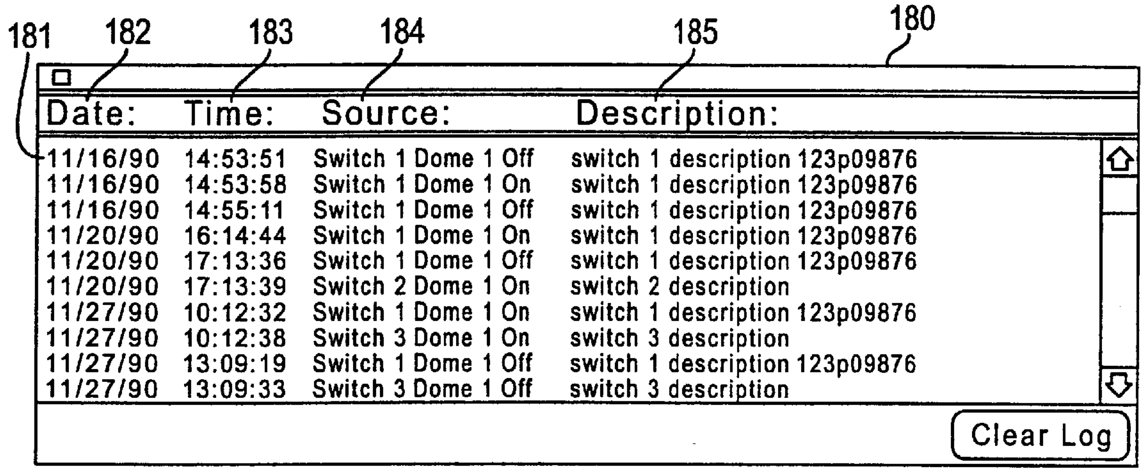
FIG. 22 illustrates an alarm log information window 170 generated by the GCU that shows a chronological list of the alarm activity.

The operator can select a single line in the log 171 by clicking on it. Alternatively, the operator can institute a search that allows the computer to quickly locate and queue-up the selected event for review by clicking on the search button 177. The ability of the computer to automatically find a specific video segment on the VCR tape represents a significant benefit to the operator in that he does not have to take the time to perform the search manually. The operator can also edit the descriptive comment of the selected line, or print the entire log. FIG. 22 shows an alarm log information 180 window that contains a chronological list 181 reflecting the alarm activity of the system. The logged information consists of the date 182, the time 183, the triggering source of the event 184, and a descriptive comment 185 (that can be edited by the operator). The triggering source 184 can be any of the sensors 6 connected to the system and programmed as an alarm. An access control card reader can also be an alarm triggering source indicating an exception event, such as someone trying to gain access to an unauthorized area or someone trying to use a card that has been reported lost or stolen.

Figure 23:
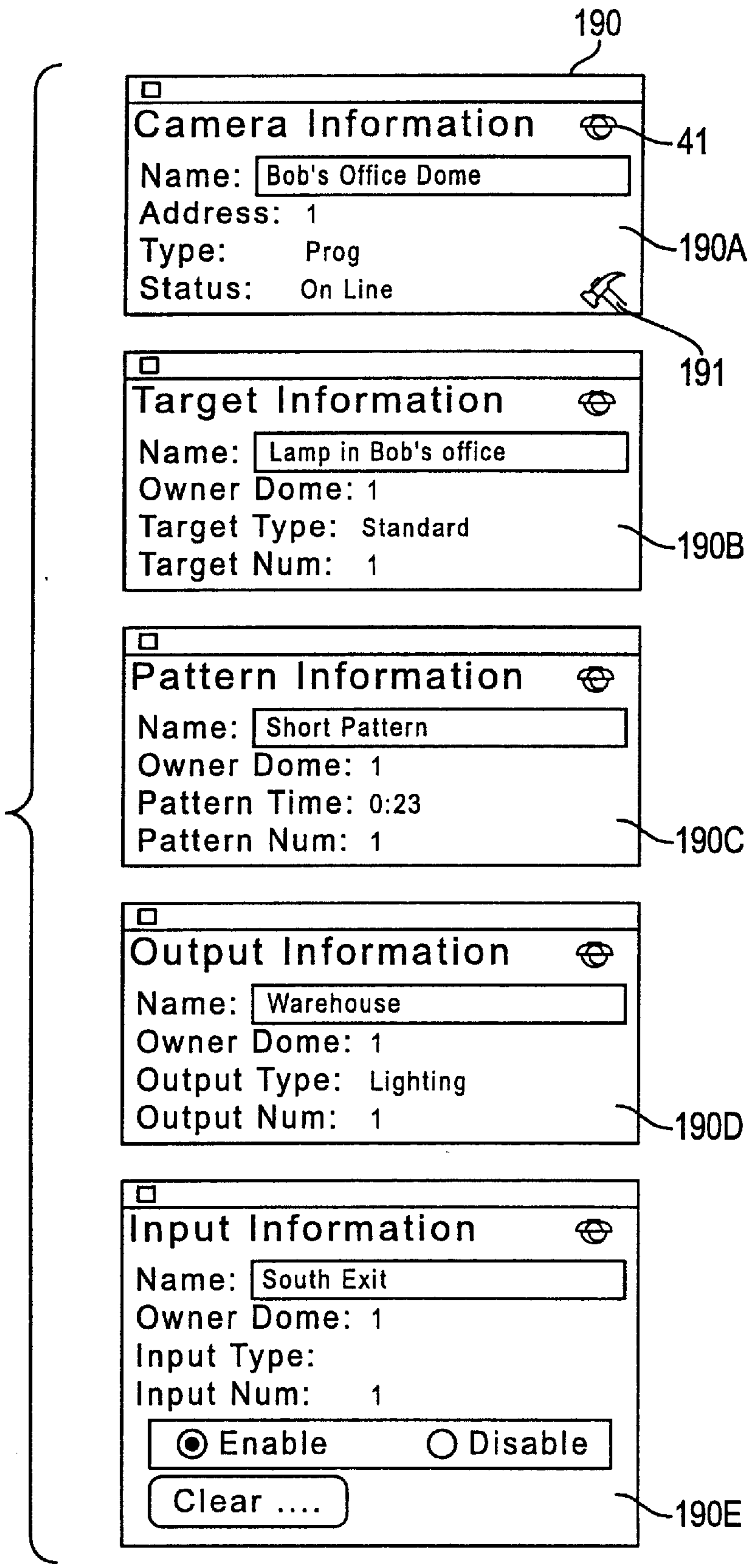
FIG. 23 illustrates device information windows generated by the GCU that show general information about physical devices.

FIG. 23 shows device information windows 190A–190E which contain general information about physical devices, such as domes or cameras 190A, input devices 190E, output devices 190D, or device functions, such as targets 190B or patterns 190C. The device information window 190A–190E is "opened" by double-clicking (clicking twice in rapid succession) on the icon of the device or function. Once opened, the window 190A–190E will reflect information about the device whose icon was last selected (by double clicking on it). Clicking on the dome icon 41 in the upper right hand corner of the camera information window 190A will cause the associated dome's icon 31, 32 or 41 on the floor plan 30 to flash, allowing the operator to locate the associated device on the floor plan 30.

Figure 24:
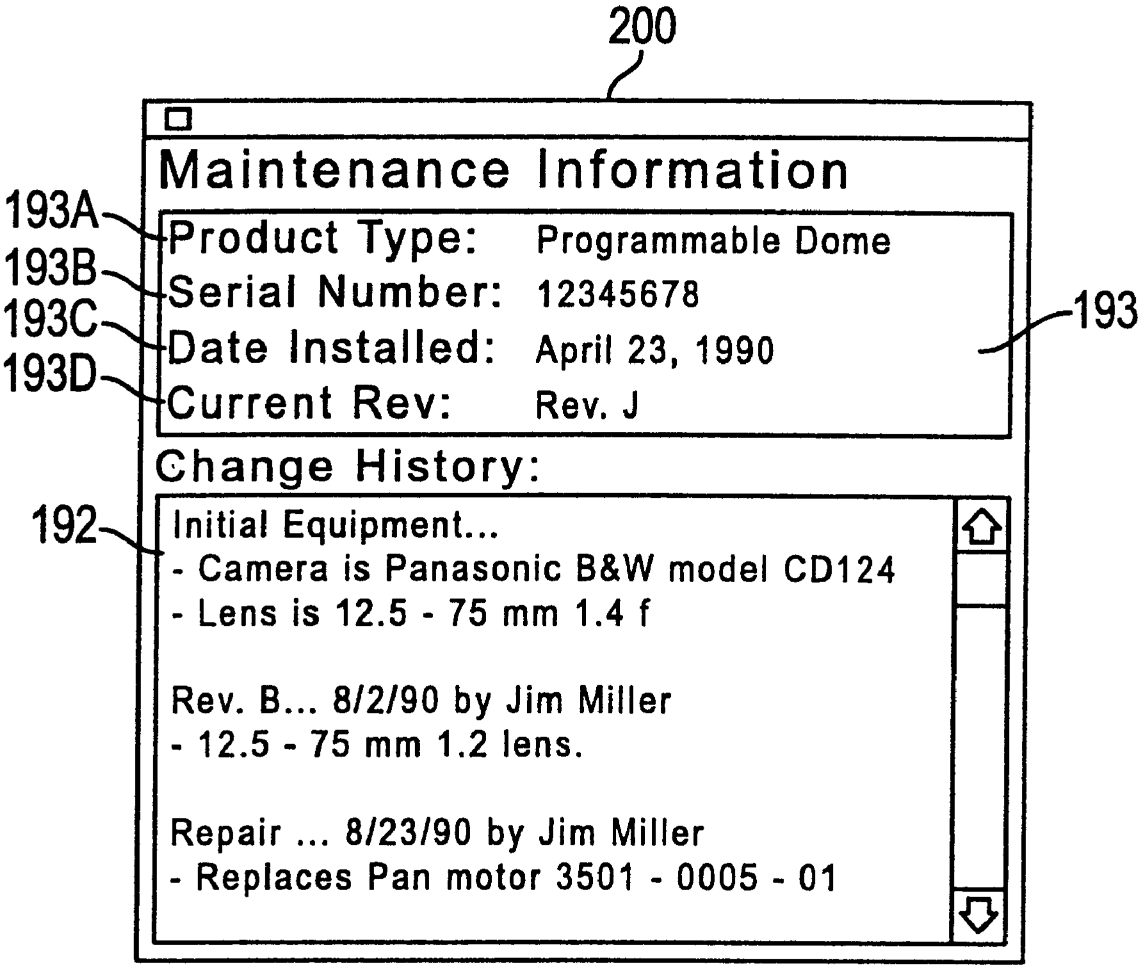
FIG. 24 shows a maintenance information window generated by the GCU that provides maintenance information for the physical devices.

The camera information window 190A contains a small graphic depicting a hammer 191 in the corner. Clicking on the hammer 191 opens a maintenance information window 200 as shown in FIG. 24. This window 200 contains very specific data 193 related to the dome or camera, such as its product type 193A, current revision 193D, date of installation 193C, Serial number 193B, and an area for the service personnel to enter information on device components 192, such as upgrades and modifications.

FIGS. 25–30 are illustrations of various types of information windows which, when selected, appear on the screen of the display unit 3. Generally system help windows contain instructional information about system operations, features and the GCU 1. These windows can be called-up by way of a menu selection and are always available to the operator.

Figure 25:
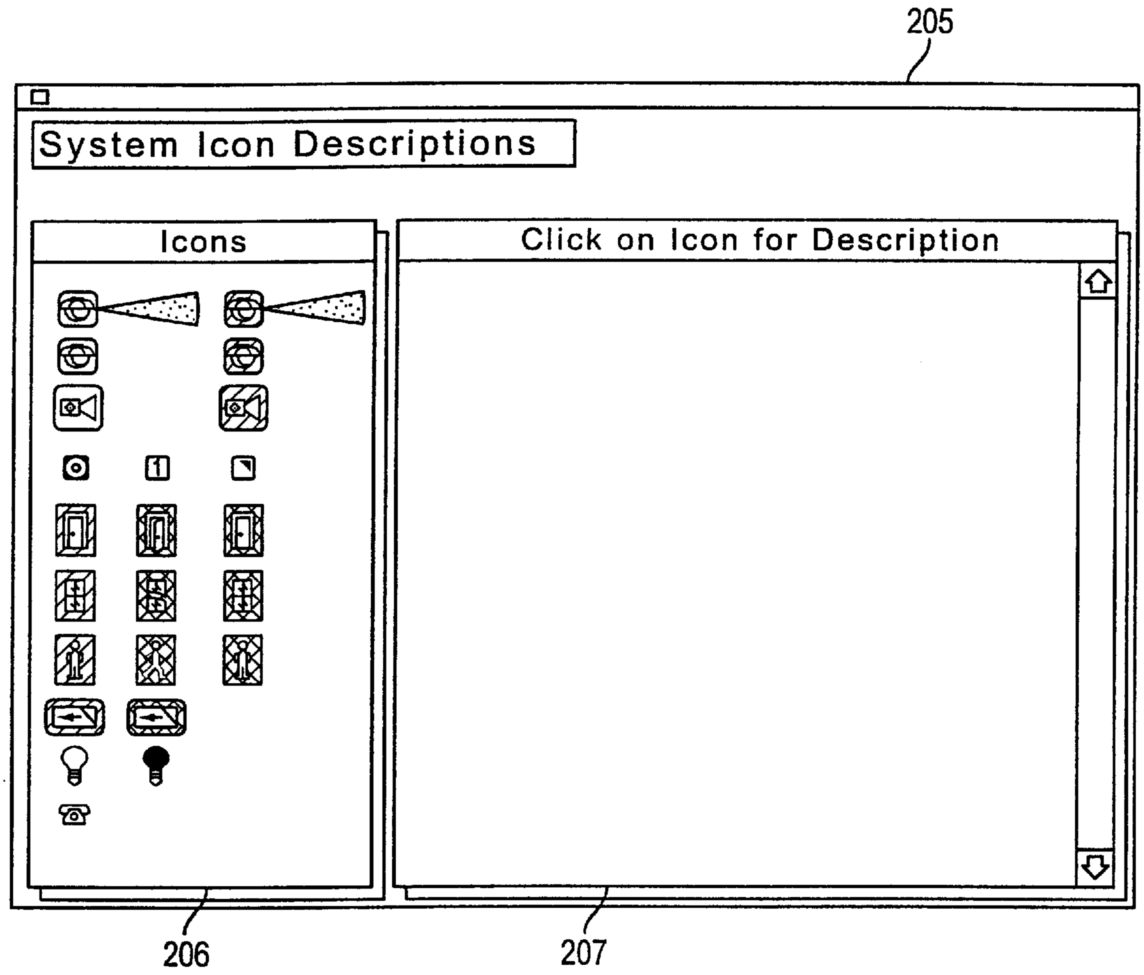
FIG. 25 shows an icon description help window generated by the GCU that provides help information related to various graphical icons.

FIG. 25 is an icon description help menu 205. All types of icons generated by the GCU 1 are displayed in an icon summary 206 section. When the operator clicks on any one of the icons displayed in the icon summary section 206, information concerning that particular type of icon is displayed in a help display section 207 of the window 205.

Figure 26:
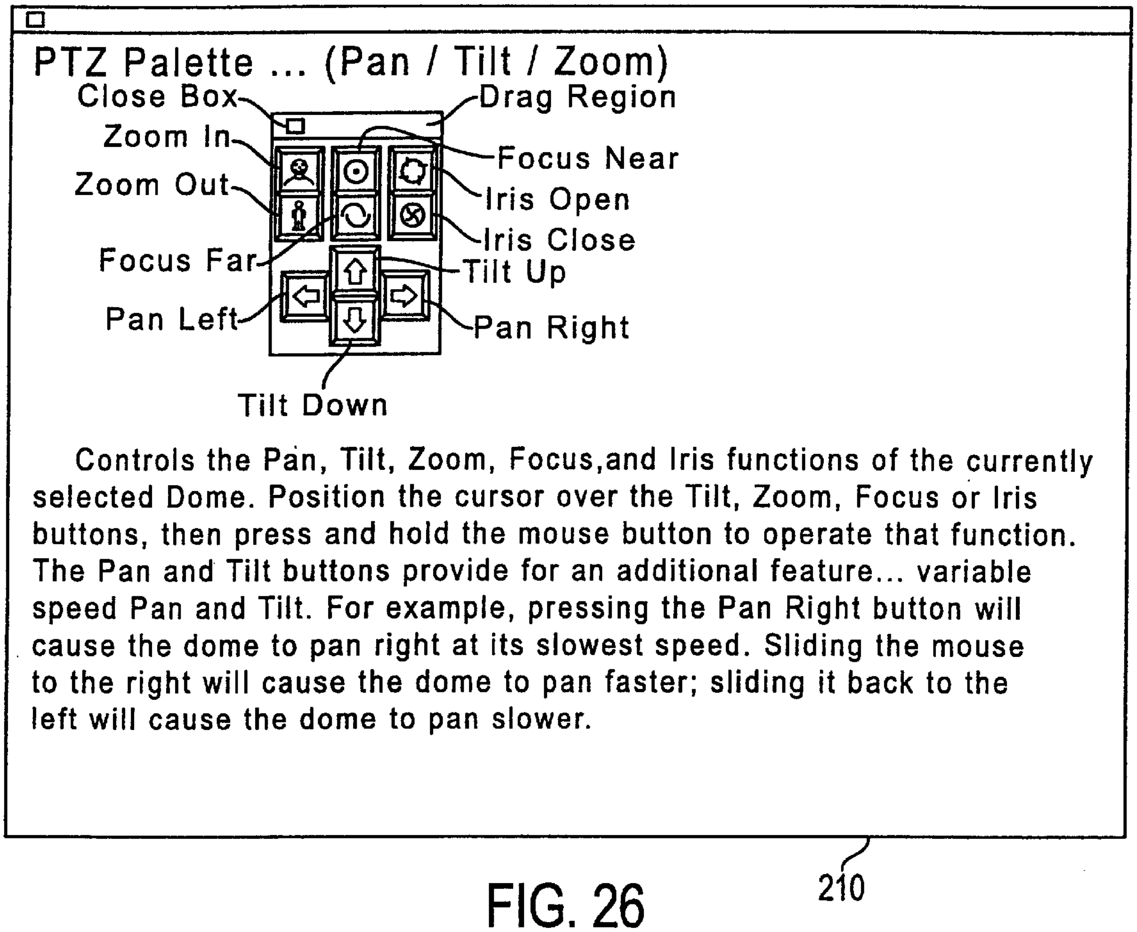
FIG. 26 shows a pan/tilt/zoom help window generated by the GCU that provides help information related to the PZT palette.

FIG. 26 is a PTZ palette information window 210 which displays information related to the functioning of the PZT palette 60 discussed previously with reference to FIG. 6.

FIG. 27 is a map palette information window 215 which displays information related to the functioning of the map palette 61 discussed previously with reference to FIG. 7.

Figure 28:
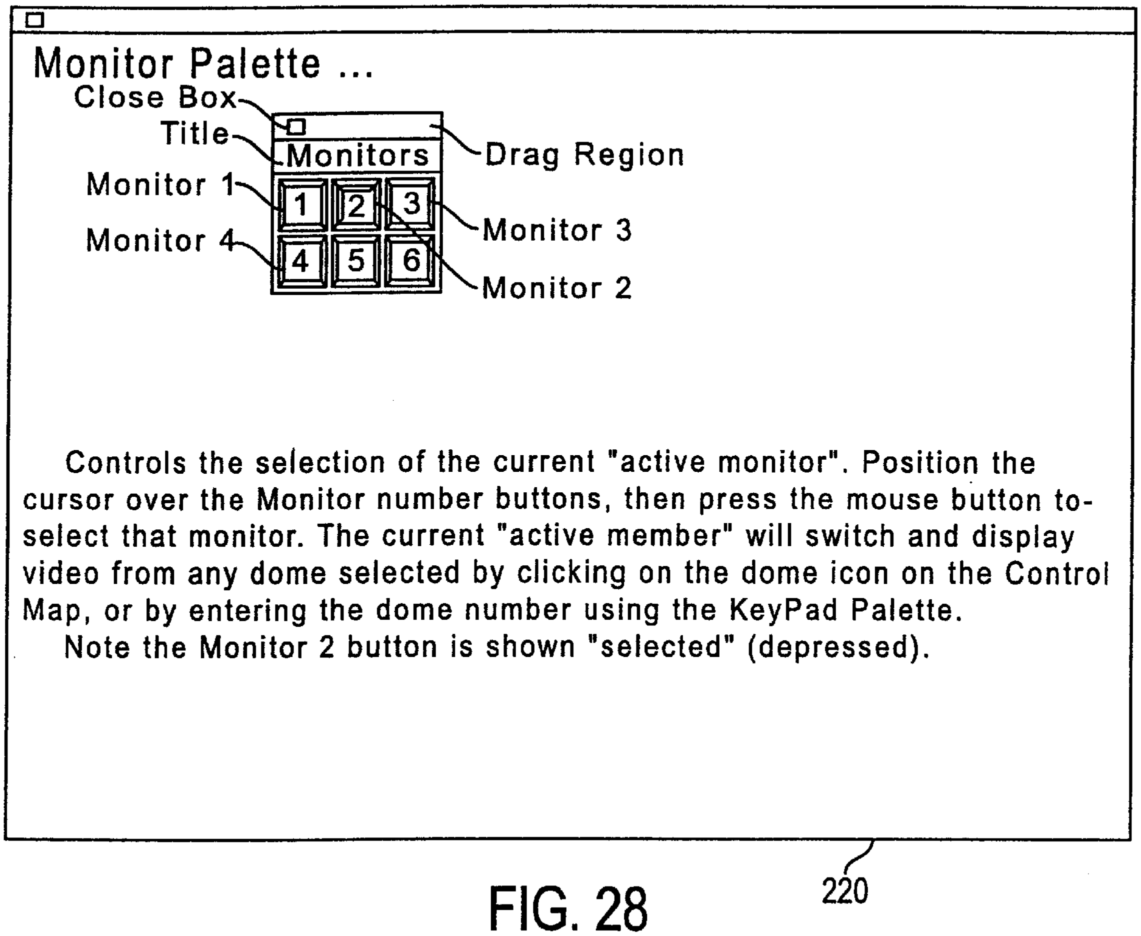
FIG. 28 shows a monitor palette help window generated by the GCU that provides help information related to the monitor palette.

FIG. 28 is a monitor palette information window 220 which displays information related to the functioning of the monitor palette 67 discussed previously with reference to FIG. 8.

FIG. 29 is a keypad palette information window 225 which displays information related to the functioning of the keypad palette 70 discussed previously with reference to FIG. 9.

Figure 30A:
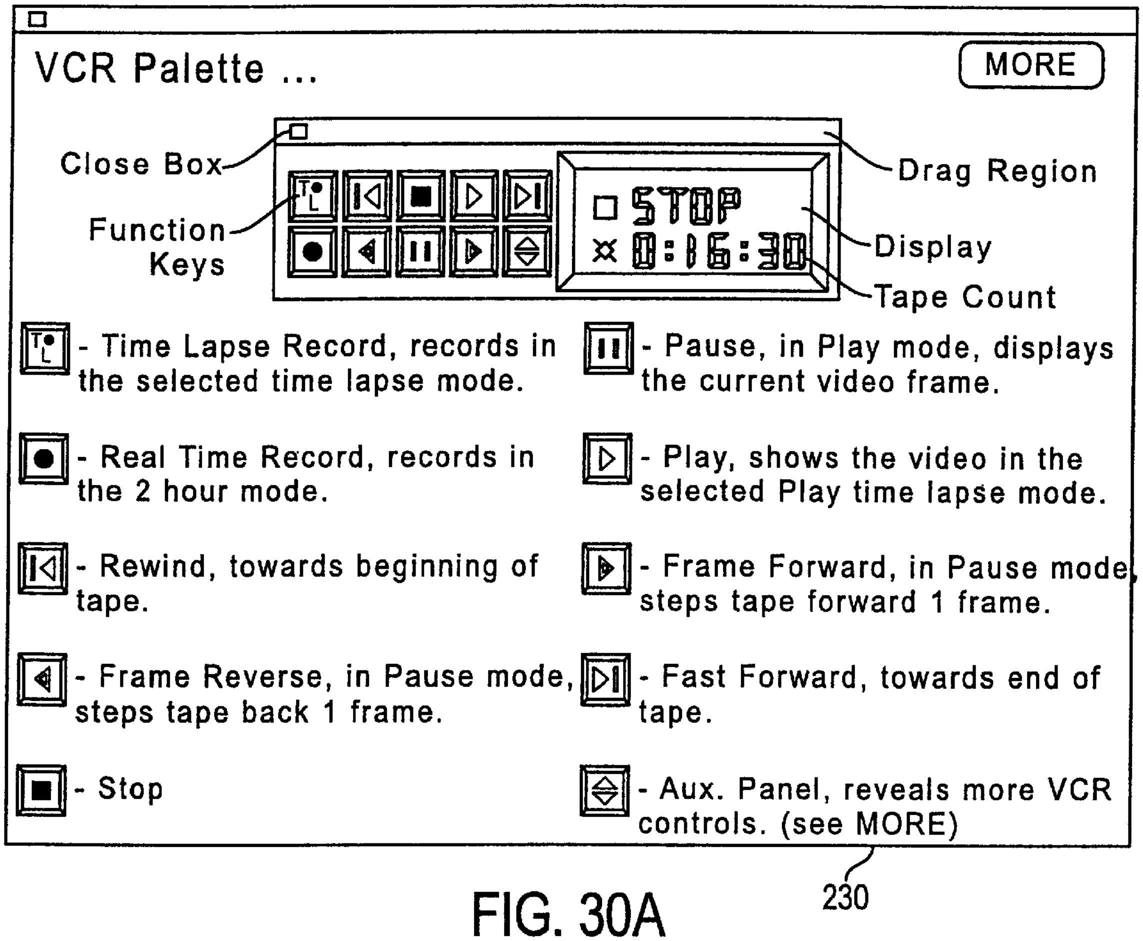
FIGS. 30A and 30B show VCR help windows generated by the GCU that provides help information related to the VCR palette.
Figure 30B:
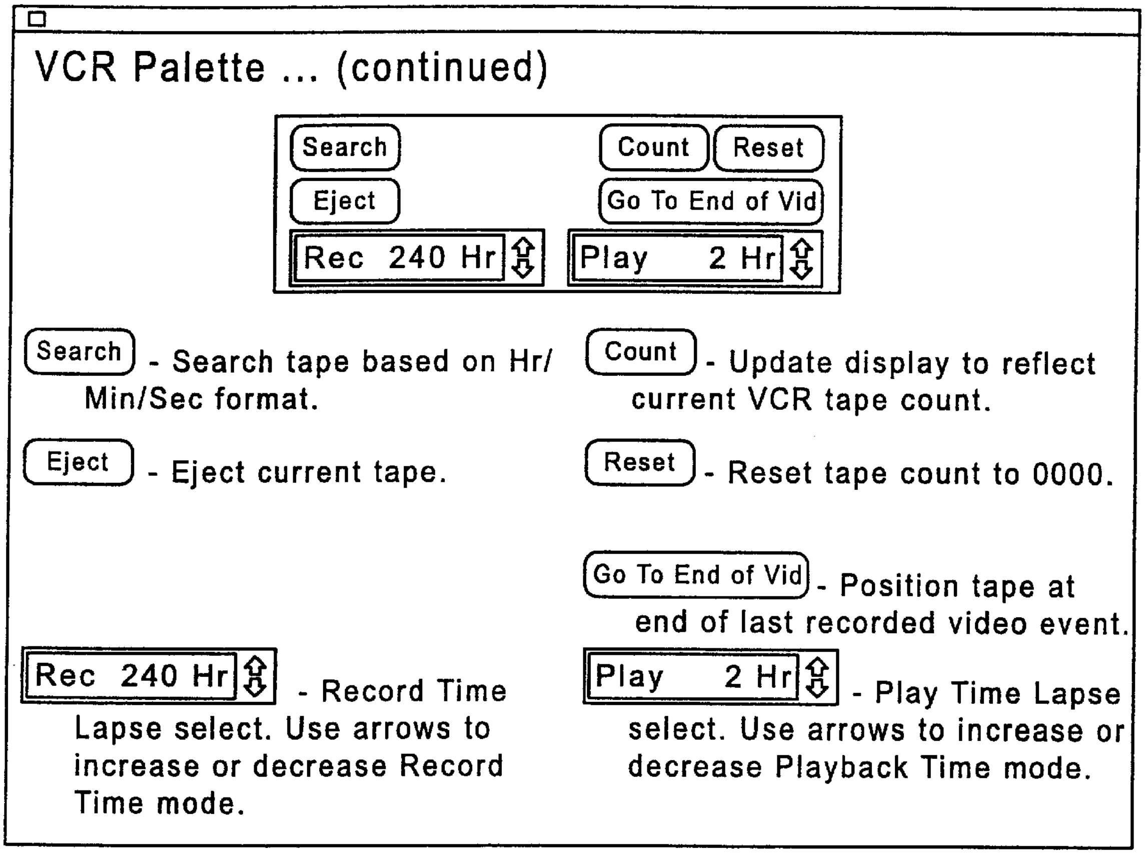

FIG. 30A is a VCR palette information window 230 which displays information related to the functioning of the VCR palette 74 discussed previously with reference to FIG. 10. FIG. 30B is a continuation of the VCR palette information window 230.

Figure 31:
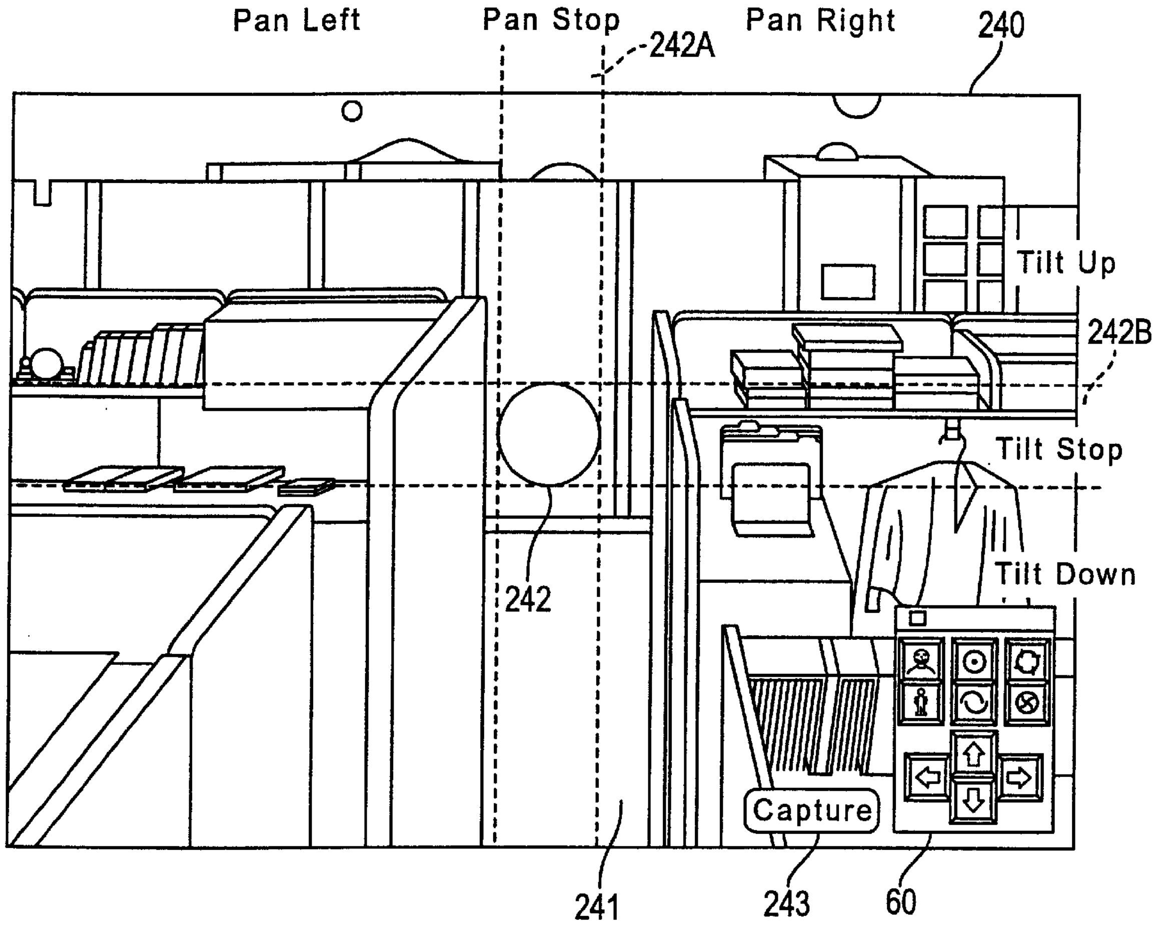
FIG. 31 shows a pan/tilt follow window generated by the GCU.

FIG. 31 illustrates a pan/tilt follow window 240. In this case, the video and graphics multiplexer 15 (see FIG. 2) superimposes graphics, such as the PTZ palette 60 and a circular follow button 242, over live video 241 received from a camera 7. This capability allows the operator to interact with on-screen graphics to control the camera 7 without diverting his attention (view) away from the live video 241. The follow button 242 located in the center of the live video image 241 provides variable speed pan/tilt control for domes or cameras.

In more detail, the operator positions the pointing icon 34 in the center of the follow button 242, then presses and holds the mouse button down. Thereafter, sliding the pointing icon 34 to the right (to just outside the follow button 242) causes the GCU 1 to instruct the camera 7 to pan slowly to the right. The GCU 1 instructs the camera 7 to increase the pan speed as the pointing icon is moved further to the right, and decrease the speed as the pointing icon moves back to the left. If the pointing icon is moved back into the zone 242A defined by the right and left ends of the follow button 242, the GCU 1 instructs the camera to stop the panning movement. The panning left motion is similar to the panning right motion, with the panning again being stopped when the pointing icon returns to the zone 242A.

The GCU 1 controls the tilting up and tilting down movement in the same manner as just described for the panning movement. In this case, however, the tilting motion is stopped when the pointing icon returns to the zone 242B defined by the top and bottom ends of the button 242.

Using the follow button 242 on the window 240, a domed can thus be panned and tilted as the pointing icon is moved to the right, left, top and bottom of the window. For example, if the pointing icon is in the lower left hand corner of the display, the GCU 1 will instruct the dome to pan to the left (at a fast pan speed) and simultaneously tilt down. Panning and tilting stop if the mouse button is released, or if the pointing icon is moved into the overlap region of the zones 242A and 242B.

The window shown in FIG. 31 also supports a hot screen function. Clicking the mouse anywhere within this full screen 240, except the area within the follow button 242 will cause the GCU 1 to instruct the dome to pan and tilt towards the pointing icon's position, effectively centering the desired object on the screen. Using this feature, the operator simply clicks on the live video object and the dome pans and tilts to center the object on the screen.

Clicking on the capture button 243 at the bottom of the pan/tilt/follow window causes the GCU 1, using the video capture 16 circuit (see FIG. 2), to digitize the video image 241 currently displayed. The digitized image is then stored in the memory unit 13 where it can be used in the Picture Log window 160 discussed previously with reference to FIG. 20 or in an employee photo ID database.

Figure 32:
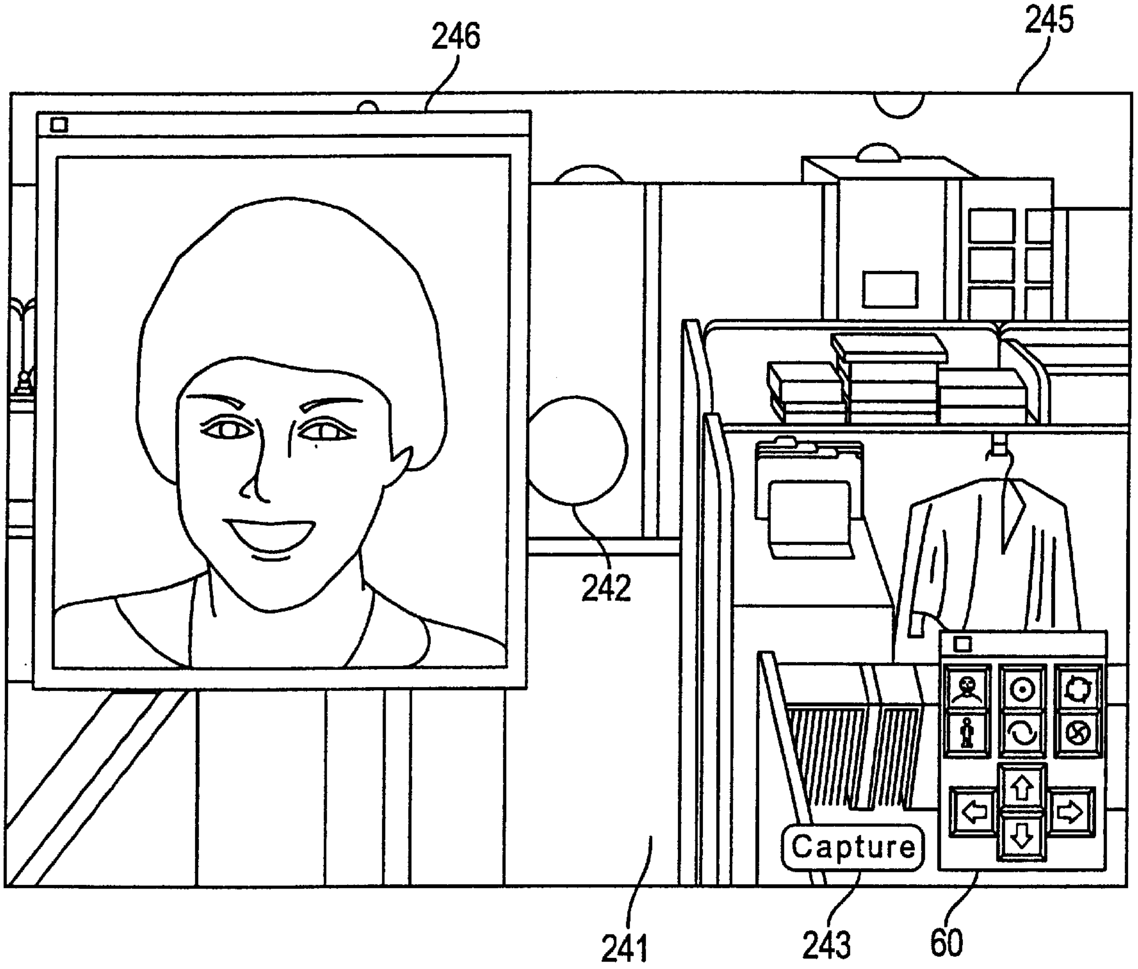
FIG. 32 shows an employee ID window generated by the GCU which provides an employee ID photo concurrent with a live video image.

FIG. 32 shows an employee ID window where a digitally captured video image 246 from the employee photo ID database is superimposed over live video 241. This allows an operator to view a file photo of a person on the same screen as a live video image of the person to insure accurate identification.

Figure 33:
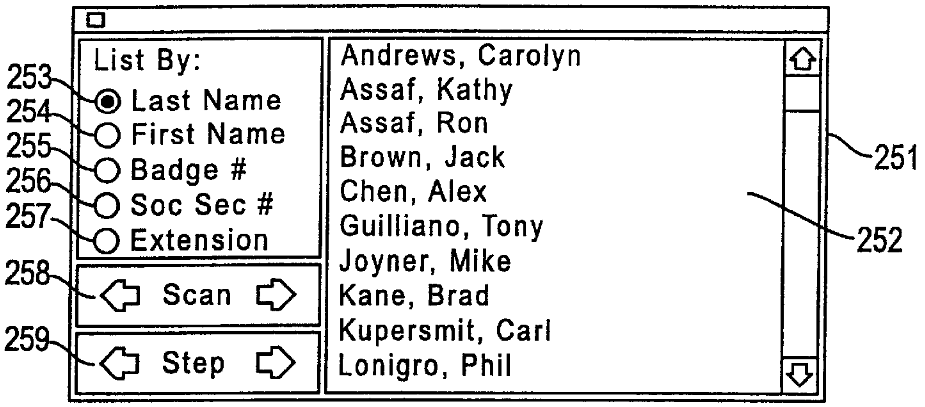
FIG. 33 shows a window generated by the GCU which depicts the content of an employee ID database.
Figure 34:
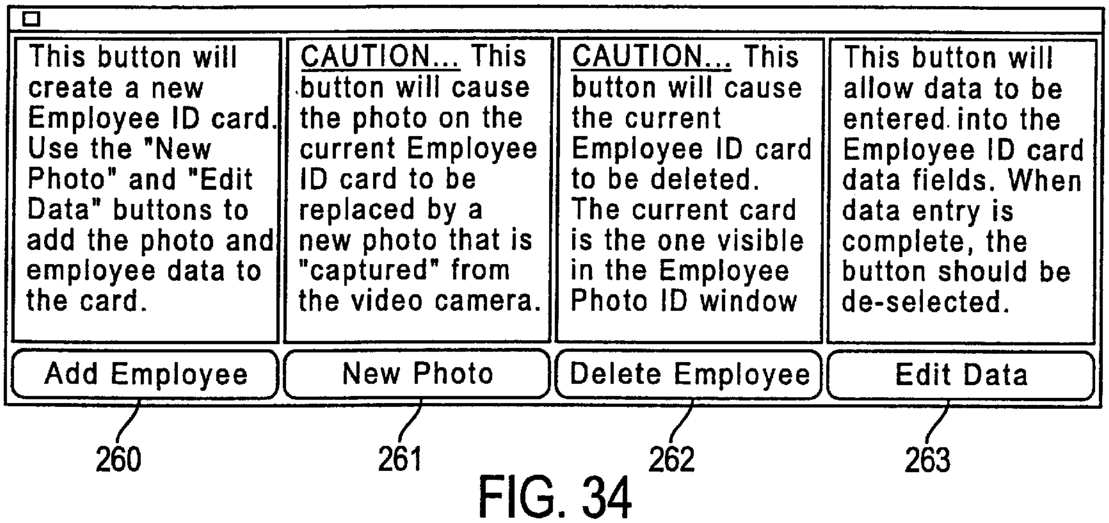
FIG. 34 shows a window generated by the GCU which permits entry and deletion of employee ID photos to the employee ID database.
Figure 35:
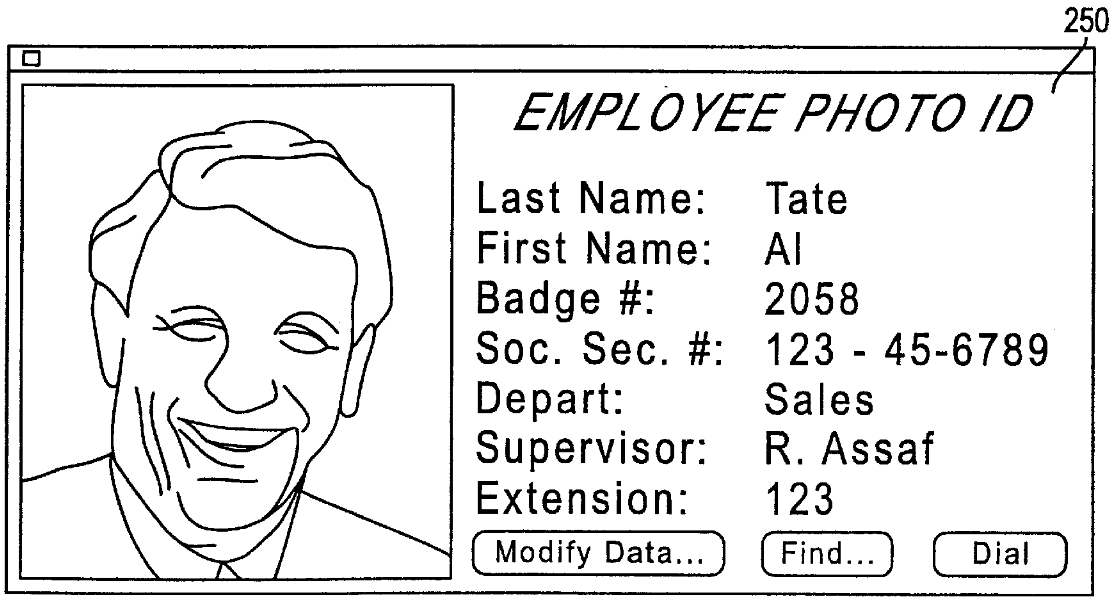
FIG. 35 shows a window generated by the GCU for displaying ID photo images.

In addition to the employee photo, the additional windows allow the operator to enter information about the employee, as shown in FIGS. 33–35.

FIG. 33 show a window which provides a way to access the employee photo ID database 251. The operator can make a selection from a scrollable list 252 based on the employees last name 253, first name 254, badge number 255, social security number 256 or phone extension 257. The operator can also scan through the database by using the scan 258 or step arrows 259.

FIG. 35 shows a window for displaying the ID photo image 246 next to various information from the employee photo ID database 251.

FIG. 34 shows a window which provides a way to add a new employee and photo to the database, to delete an employee from the database and to edit the employee information. An add employee button 260 is clicked to add an employee. A new photo button 261 is clicked to add a new photo. A delete employee button 262 is clicked to delete an employee. An edit data button is clicked to allow data to be entered into the employee ID card data fields.

Figure 36:
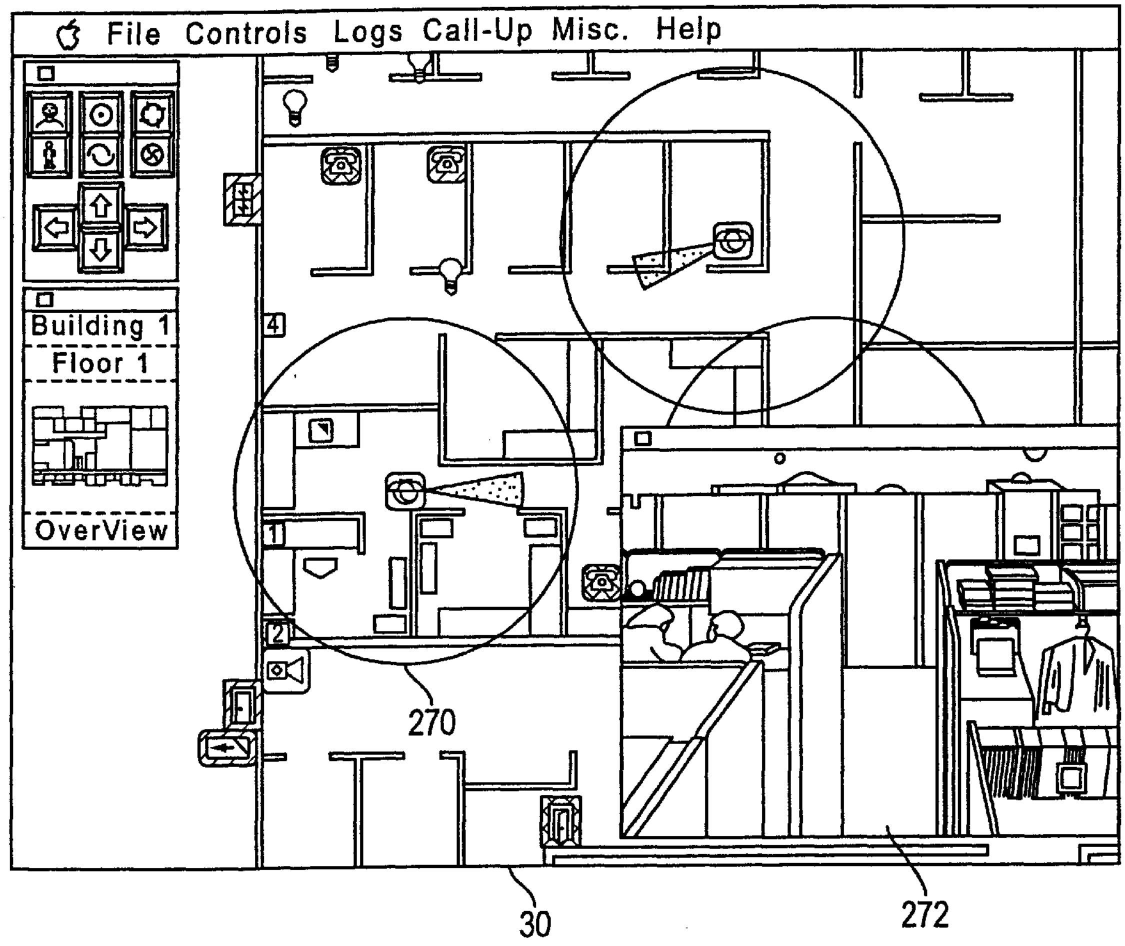
FIG. 36 shows an image generated by the GCU for allowing a virtual target feature.

FIG. 36 illustrates a virtual target feature which enables the operator to select a specific point within the large circular icon 270, which causes the GCU 1 to instruct the dome 31 centered within the circular icon 270 to pan and tilt to that point in the facility. For example, if the operator clicked on the chair 271 just below and to the left of the dome icon 31, the GCU 1 would instruct the physical dome to pan and tilt to view the chair. Also, the pan/tilt direction indicator 31PT (the cone shaped extension) would be pointing at the chair. It should be noted that this feature is based on programmable domes with the ability to be directed to specific pan and tilt coordinates. The video from the dome can be displayed in the live video window 272.

Figure 37:
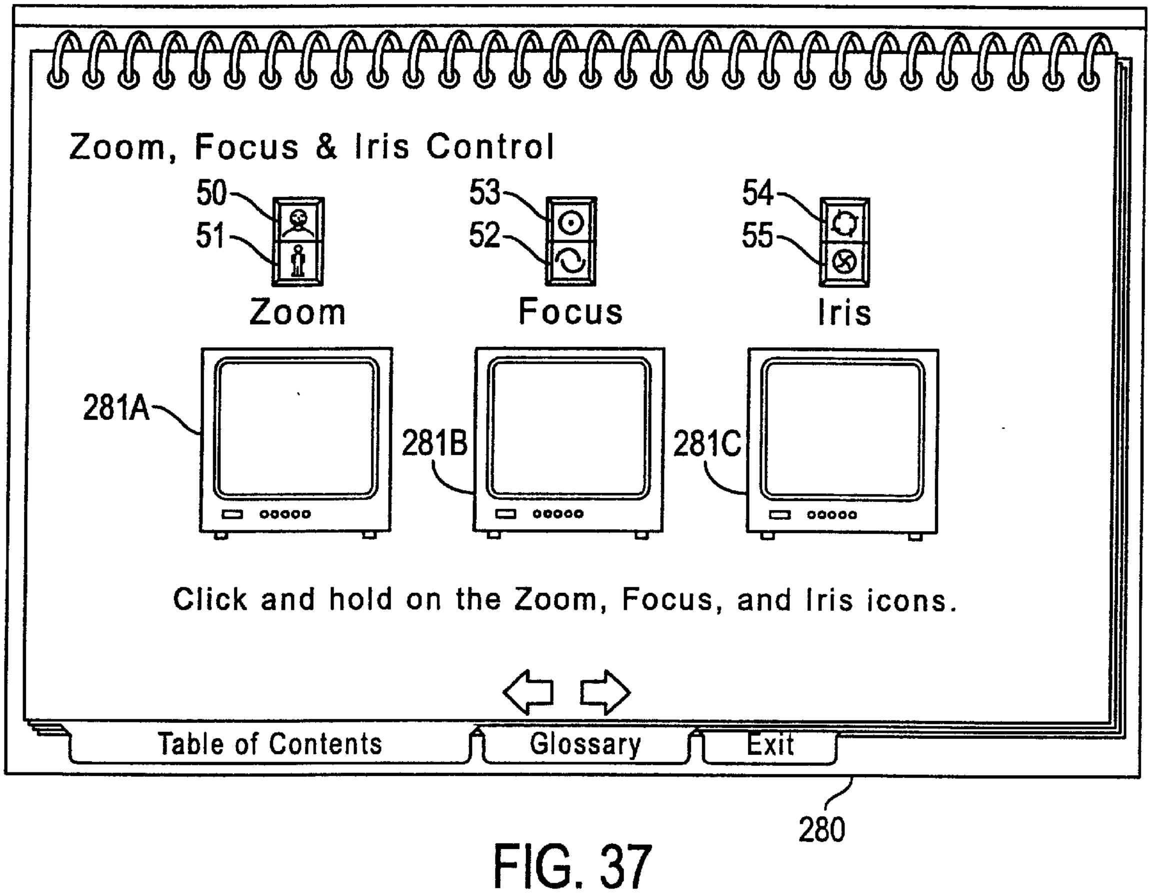
FIGS. 37 and 38 show interactive training windows generated by the GCU.
Figure 38:
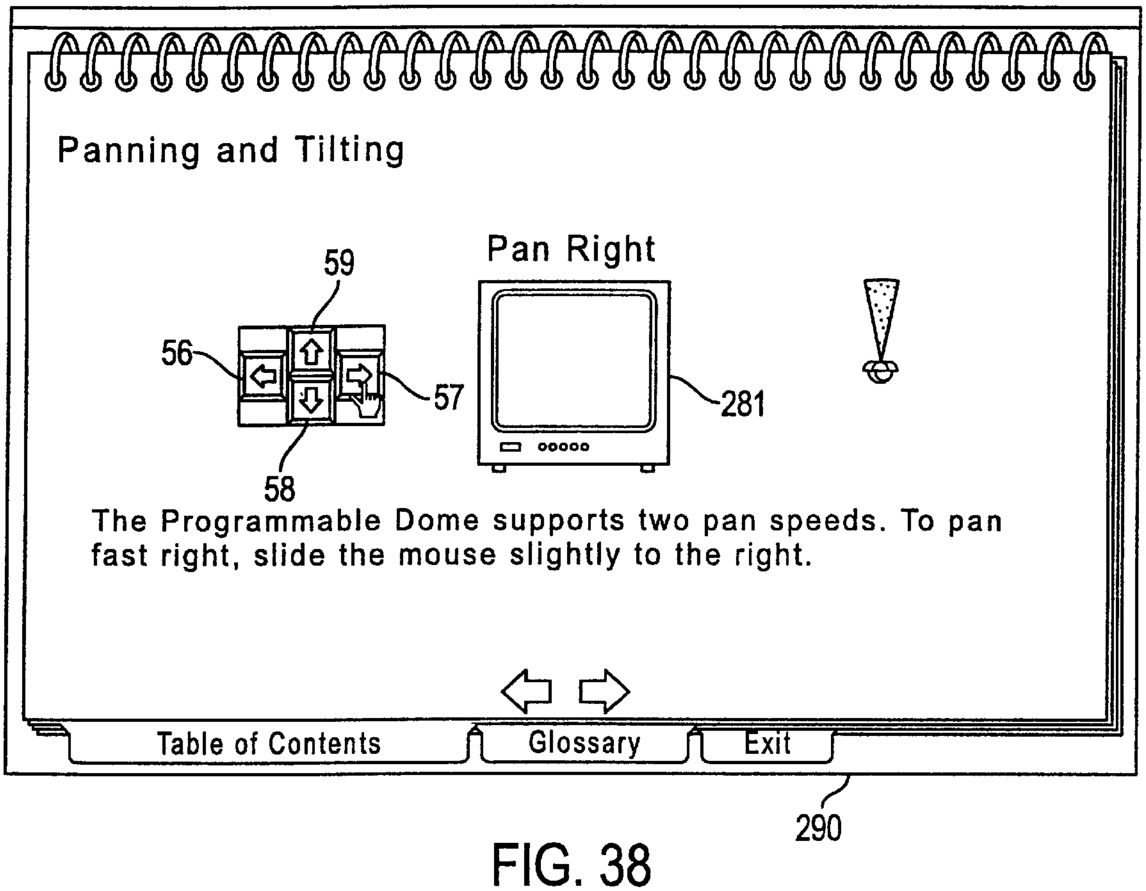
Figure 39A:
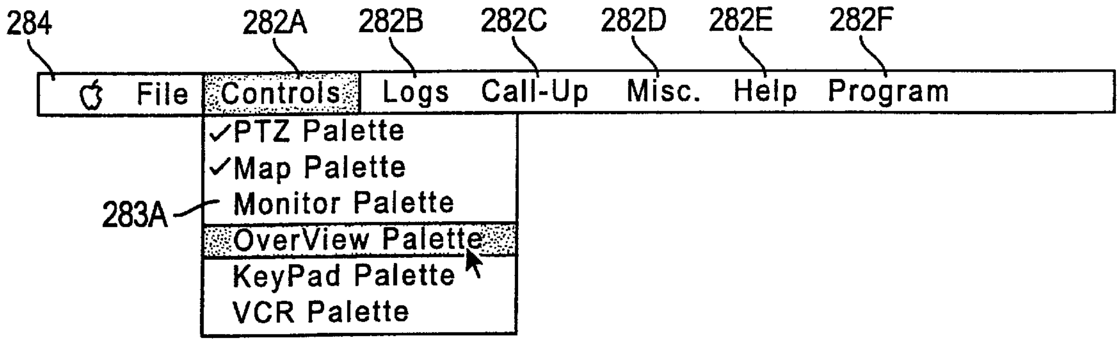
FIGS. 39A–39F show menus generated by the GCU.
Figure 39B:
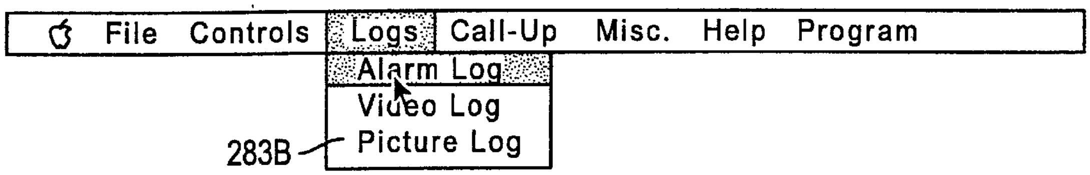
Figure 39C:
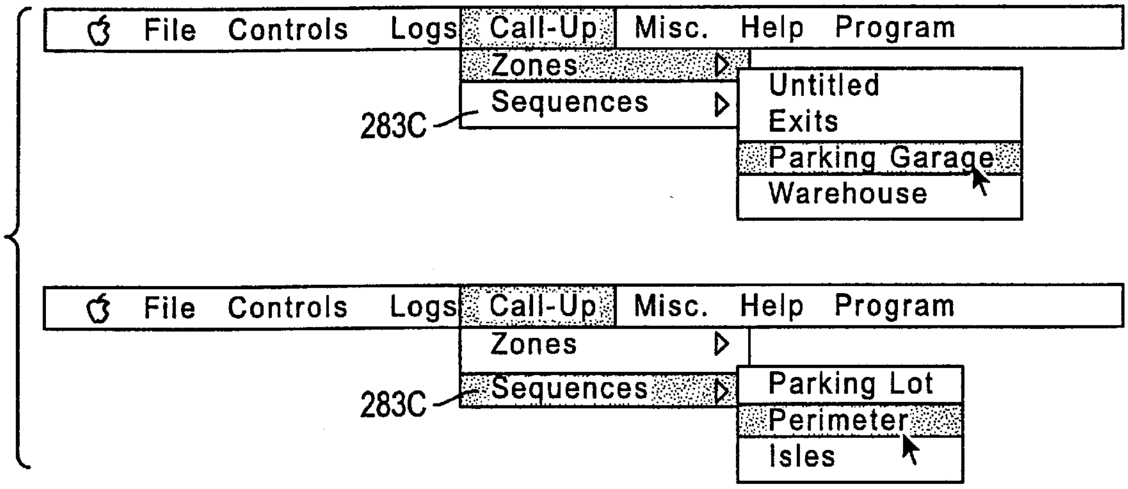
Figure 39D:
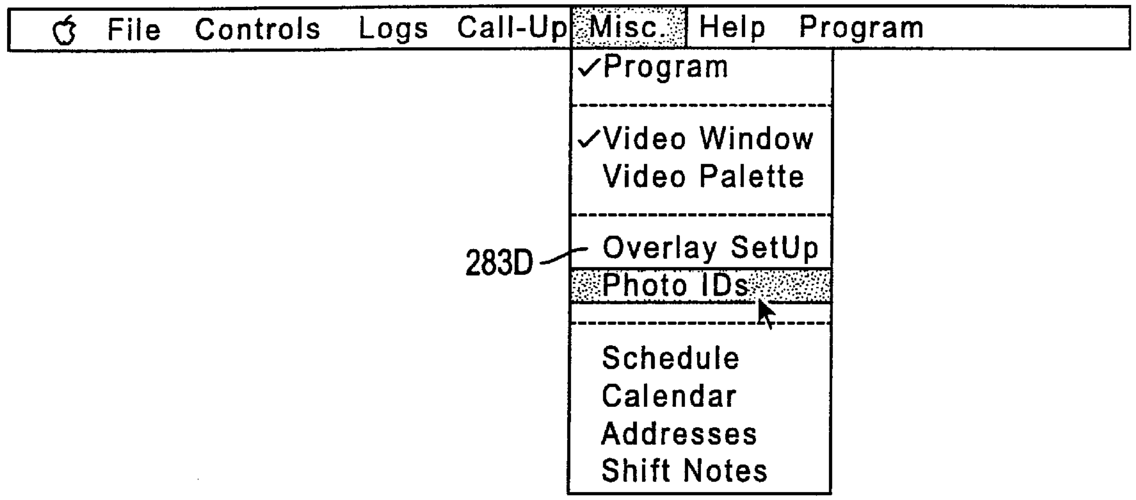
Figure 39E:
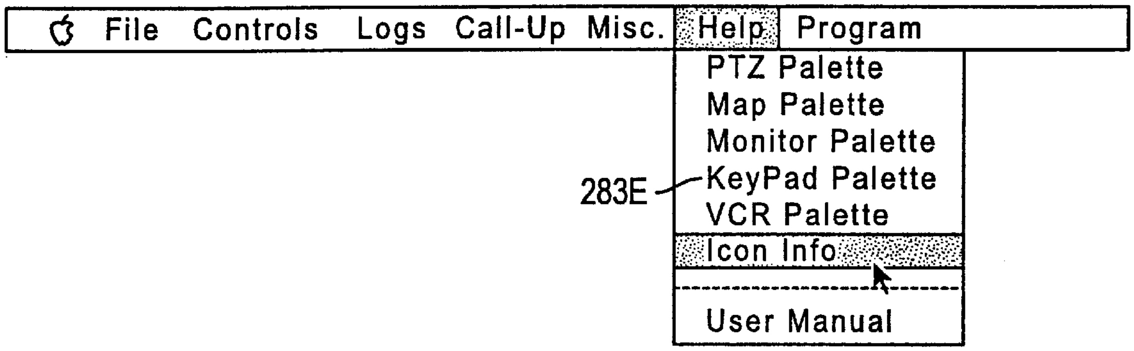
Figure 39F:
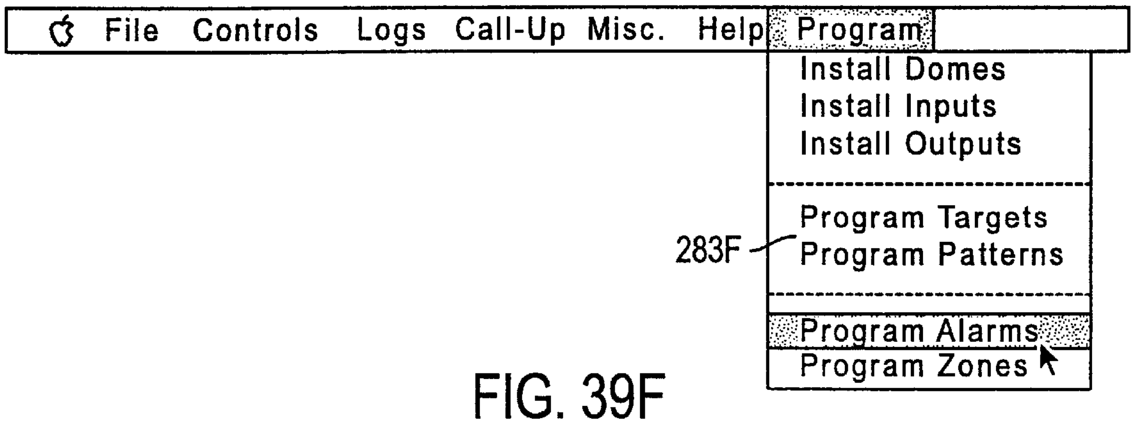
Figure 40:
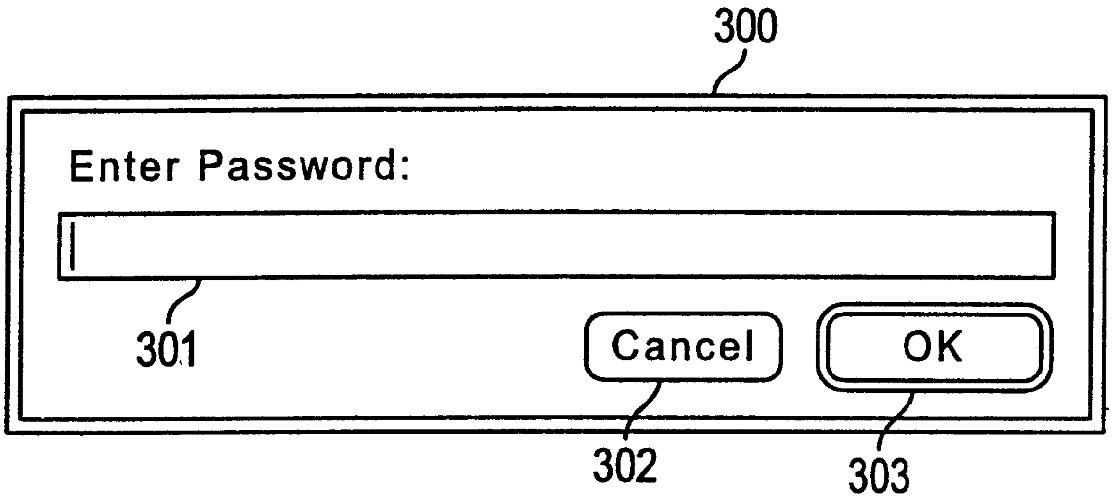
FIG. 40 shows a sign-on window generated by the GCU for entering passwords.
Figure 41:
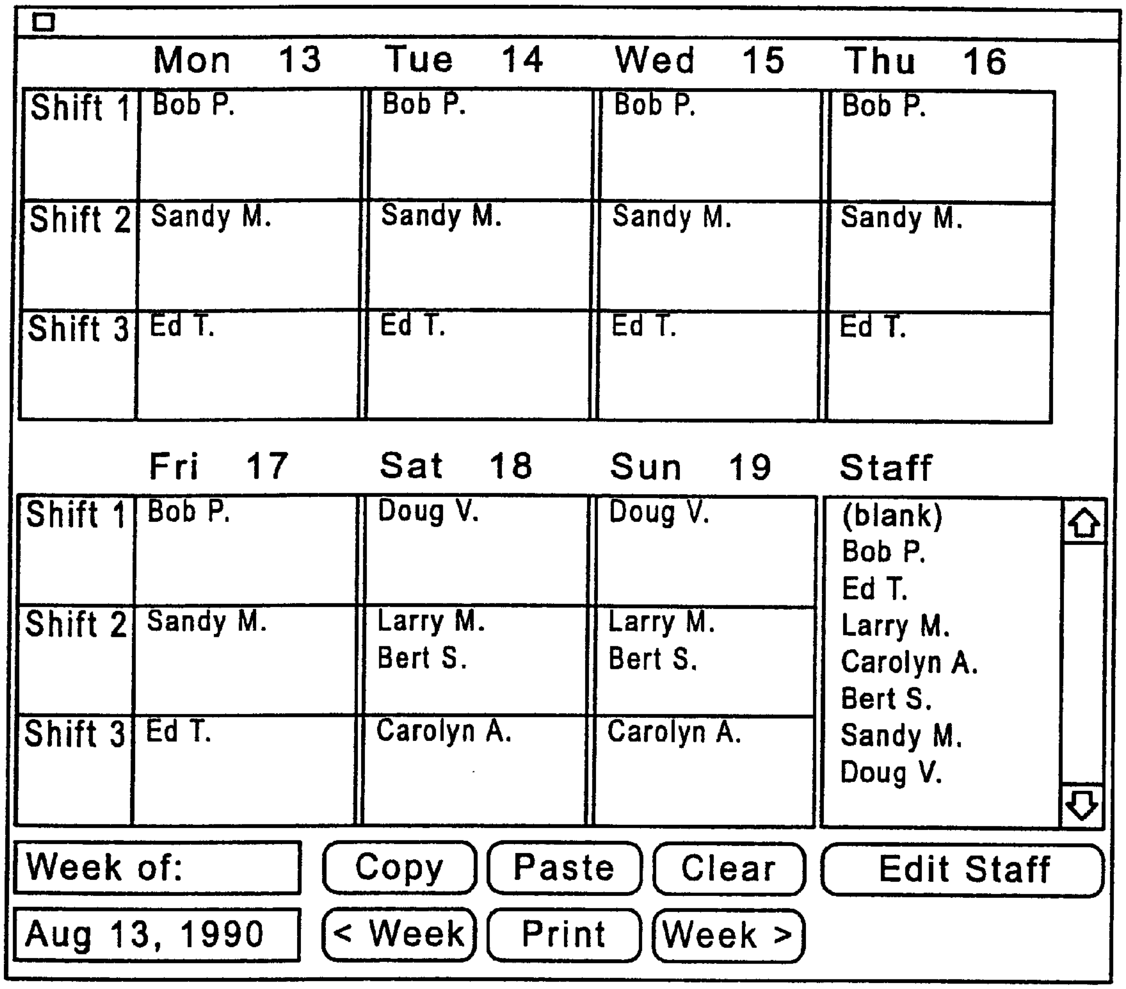
FIGS. 41–44 show various support windows generated by the GCU.
Figure 42:
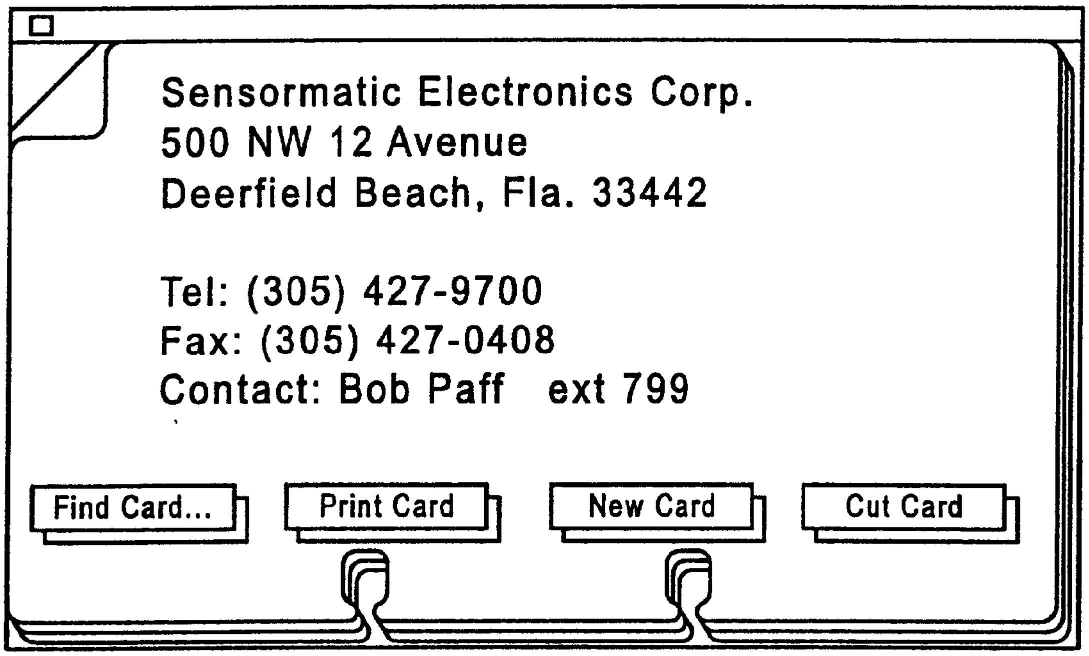
Figure 43:
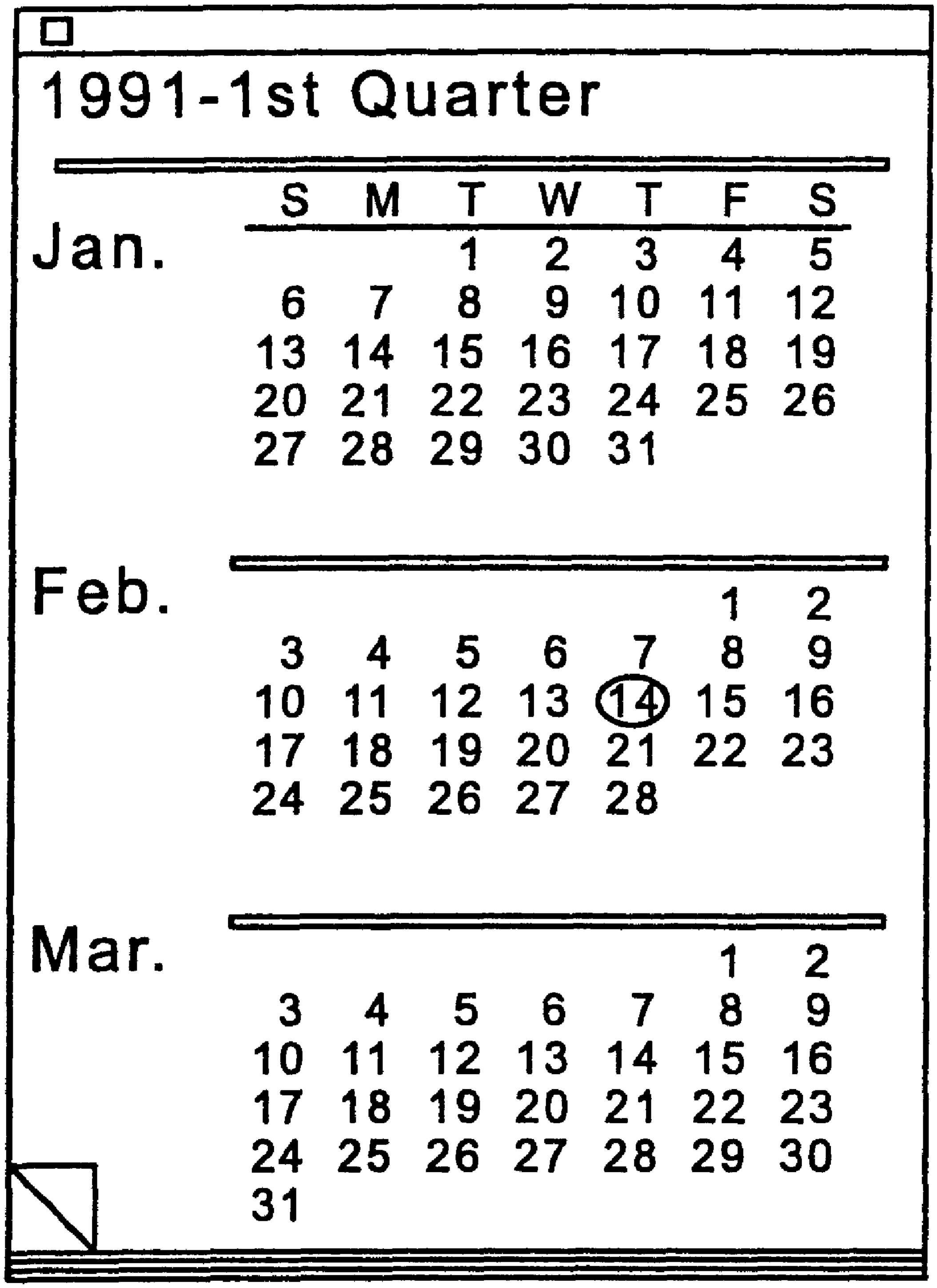
Figure 44:
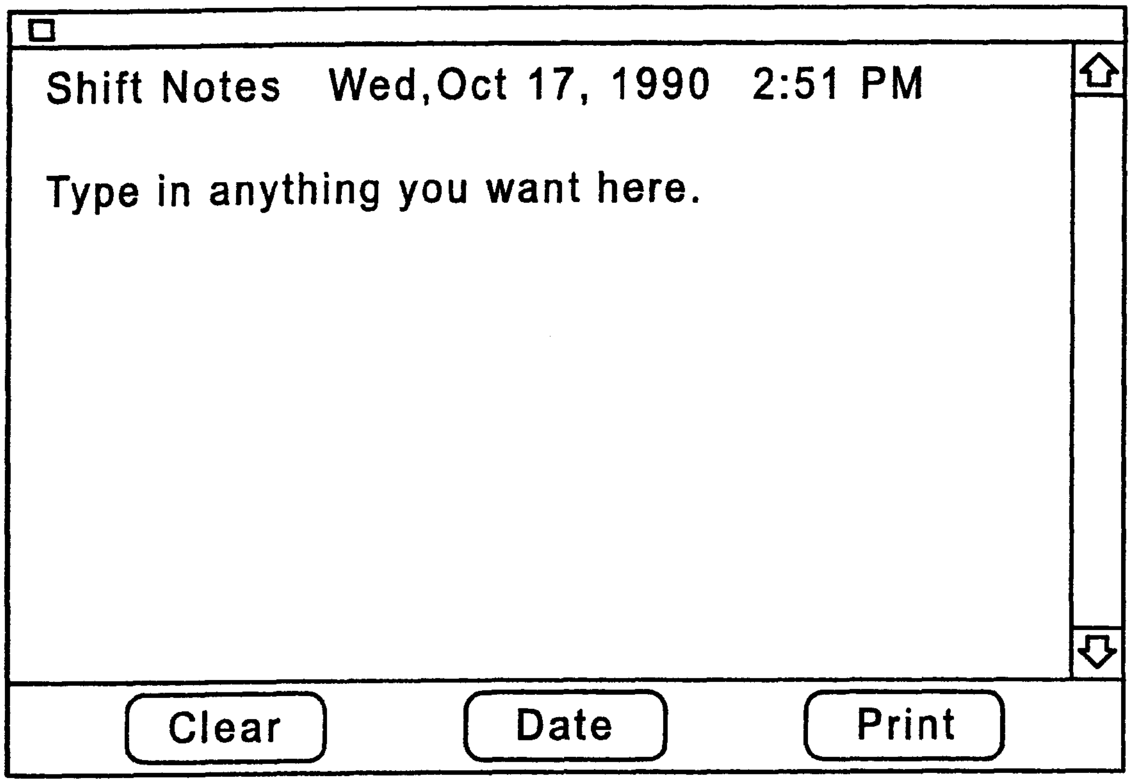

FIGS. 37–39 show interactive training manual windows 280, 290, 300 which provide an on-line training environment. These windows speed up the training process by allowing the trainee to learn the operation of the system at their own pace. It also minimizes the time spent by the security manager or a designated instructor. The training manual windows 37–39 are interactive in that they first present some fact about the system operation, then allow the trainee to practice the operation using the actual icons and graphical interface features used in the system. The training manual windows 280, 290, 300 can either simulate the result of the interaction (such as selecting a dome or panning right) or actually control a "live" dome. A method for tracking the progress of the trainee is built into the training manual window.

In a further aspect of the invention, the GCU 1 is also provided with an audio digitizer 25 and an audio amplifier 26. The latter, in turn, drives a speaker 27 (not shown).

The digitizer 24, amplifier 25 and speaker 26 enable to GCU to provide sound instructions and prompts to the operator as well as sound effects which mimic the sounds of certain of the security devices. Thus, for example, when a particular security device becomes active, audio information can be fed from the GCU to the audio amplifier 25 and output from the speaker 26 providing an audio message of the type of security device which has been activated as well as its location. Also, a sound effect can be output which provides a sound indicative of the activated security device (e.g., breaking glass, a door opening, etc.). The output voice information can, furthermore, provide instructions to the operator as to the action the operator should take in the face of the activated security device. The audio information can be supplied to the GCU 1 by the operator prerecording the information.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claim is:

1. A graphical work station for an integrated security system for controlling a plurality of security devices in a protected premises including a plurality of output devices and a plurality of video surveillance cameras, comprising a control unit communicating with a display unit having one or more monitors and an input device operable by an operator, (a) said control unit having storage means for storing a graphical image representing selected portions of the layout of said protected premises, including first icons representative of said output devices and second icons representative of said video surveillance cameras, each first icon representative of an output device being located on said graphical image in the same relative location as that output device is located in said protected premises and each second icon representative of a video surveillance camera being located on said graphical image in the same relative location as that video surveillance camera is located in said protected premises, (b) said control unit having means to display on said display unit said stored graphical image with said each first icon and said each second icon displayed in its respective location, (c) said input device having means controllable by said operator for selecting a given second icon on said graphical image representative of a given one of said plurality of video surveillance cameras to activate said given one of said plurality of video surveillance cameras, (d) said control unit having means responsive to the operation of said input device by said operator to select said given second icon on said graphical image representative of said given one of said plurality of video surveillance cameras, for displaying on said display unit a live video image from said given one of said plurality of video surveillance cameras, (e) said input device having means controllable by said operator for selecting a given first icon on said graphical image representative of a given one of said plurality of output devices to control said given one of said plurality of output devices, (f) said control unit also having means for activating or deactivating an output device to control a given security function of said output device from said graphical image, (g) said control unit also having means responsive to operation of said input device by said operator to control the pan, tilt and zoom functions of said selected camera from said graphical image.

2. A graphical work station in accordance with claim 1 wherein:

the output device is a door which may be locked or unlocked by said operator by operating said input device.

3. A graphical work station for an integrated security system for controlling a plurality of security devices in a protected premises including a plurality of output devices and a plurality of video surveillance cameras, comprising a control unit communicating with a display unit having one or more monitors and an input device operable by an operator, (a) said control unit having storage means for storing a graphical image representing selected portions of the layout of said protected premises, including first icons representative of said output devices and second icons representative of said video surveillance cameras, each first icon representative of an output device being located on said graphical image in the same relative location as that output device is located in said protected premises and each second icon representative of a video surveillance camera being located on said graphical image in the same relative location as that video surveillance camera is located in said protected premises, (b) said control unit having means to display on said display unit said stored graphical image with said each first icon and said each second icon displayed in its respective location, (c) said input device having means controllable by said operator for selecting a given second icon on said graphical image representative of a given one of said plurality of video surveillance cameras to activate said given one of said plurality of video surveillance cameras, (d) said control unit having means responsive to the operation of said input device by said operator to select said given second icon on said graphical image representative of said given one of said plurality of video surveillance cameras, for displaying on said display unit a live video image from said given one of said plurality of video surveillance cameras, (e) said input device having means controllable by said operator for selecting a given first icon on said graphical image representative of a given one of said plurality of output devices to control said given one of said plurality of output devices, (f) said control unit also having means for activating or deactivating an output device to control a given security function of said output device, (g) said control unit further having means to simultaneously display on a monitor on said display unit both a sub-image palette showing a graphical image of an entire area on a small scale, and adjacent thereto, an enlarged graphical image with said first and/or second icons of a selected smaller portion of said entire area, and (h) said input device, when operated by said operator, having means to select the smaller portion of said entire area for display on said monitor in an enlarged graphical image.

4. A graphical work station in accordance with claim 3 wherein:

the input device has means associated with said control unit for scrolling the enlarged graphical image to the right or left and up or down to enable viewing adjacent portions of said enlarged graphical image.

5. A graphical work station in accordance with claim 3 wherein:

the enlarged graphical image selected for viewing is highlighted on the graphical image of the entire area thereby enabling the operator to determine the relative location of the enlarged graphical image to the entire area.

6. A graphical work station for an integrated security system for controlling a plurality of security devices in a protected premises including a plurality of output devices and a plurality of video surveillance cameras, comprising a control unit communicating with a display unit having one or more monitors and an input device operable by an operator, (a) said control unit having storage means for storing a graphical image representing selected portions of the layout of said protected premises, including first icons representative of said output devices and second icons representative of said video surveillance cameras, each first icon representative of an output device being located on said graphical image in the same relative location as that output device is located in said protected premises and each second icon representative of a video surveillance camera being located on said graphical image in the same relative location as that video surveillance camera is located in said protected premises, (b) said control unit having means to display on a monitor of said display unit said stored graphical image with said each first icon and said each second icon displayed in its respective location, (c) said input device having means controllable by said operator for selecting a given second icon on said graphical image representative of a given one of said plurality of video surveillance cameras to activate said given one of said plurality of video surveillance cameras, (d) said control unit having means responsive to the operation of said input device by said operator to select said given second icon on said graphical image representative of said given one of said plurality of video surveillance cameras, for displaying on said display unit a live video image from said one of said plurality of video surveillance cameras, (e) said input device having means controllable by said operator for selecting a given first icon on said graphical image representative of a given one of said plurality of output devices to control said given one of said plurality of output devices, and (f) said control unit also having means for activating or deactivating an output device to control a given security function of said output device, and (g) the live video image from said given one of said plurality of video surveillance cameras is displayed in a window on said monitor of said display unit simultaneously displaying the graphical image.

7. A graphical work station for an integrated security system for controlling a plurality of security devices in a protected premises including a plurality of output devices and a plurality of video surveillance cameras, comprising a control unit communicating with a display unit having one or more monitors and an input device operable by an operator, (a) said control unit having storage means for storing a graphical image representing selected portions of the layout of said protected premises, including first icons representative of said output devices and second icons representative of said video surveillance cameras, each first icon representative of an output device being located on said graphical image in the same relative location as that output device is located in said protected premises and each second icon representative of a video surveillance camera being located on said graphical image in the same relative location as that video surveillance camera is located in said protected premises, (b) said control unit having means to display on said display unit said stored graphical image with said each first icon and said each second icon displayed in its respective location, (c) said input device having means controllable by said operator for selecting a given second icon on said graphical image representative of a given one of said plurality of video surveillance cameras to activate said given one of said plurality of video surveillance cameras, (d) said control unit having means responsive to the operation of said input device by said operator to select said given second icon on said graphical image representative of said given one of said plurality of video surveillance cameras, for displaying on said display unit a live video image from said given one of said plurality of video surveillance cameras, (e) said input device having means controllable by said operator for selecting a given first icon on said graphical image representative of a given one of said plurality of output devices to control said given one of said plurality of output devices, and (f) said control unit also having means for activating or deactivating an output device to control a given security function of said output device, (g) the control unit includes a video and graphics multiplexer having means to superimpose graphics on said live video image from said one of said surveillance cameras being displayed on said display unit.

8. A graphical work station in accordance with claim 7 wherein:

said live video image is displayed on a first monitor of said display unit and said graphical image is displayed on a second monitor of said display unit, said first and second monitors being different monitors of said display unit, the control unit having means to indicate on said first monitor of said display unit displaying said live video image a preselected region, said input device having means controllable by the operator for designating on said first monitor of said display unit displaying said live video image a point inside said preselected region, said control unit, when said point is so designated, having means to pan and tilt said one of said plurality of video surveillance cameras to have within the center of its field of view the point so designated, whereby the field of view may be controlled from the live video image.

9. A graphical work station in accordance with claim 8 wherein:

the control unit and the video and graphics multiplexer have means to superimpose on said first monitor of said display unit displaying said live video image a sub-image control palette from which the pan, tilt and zoom of said one of said plurality of video surveillance cameras is controlled by operation of the input device.

10. A graphical work station in accordance with claim 8 wherein:

the speed of the pan and tilt of said one of said plurality of video surveillance cameras toward the designated point is a function of the distance of the designated point from center of said preselected region.

11. A graphical work station in accordance with claim 7 wherein:

the control unit having means to indicate on said first monitor displaying the live video image the center area being viewed by said one of said plurality of video surveillance cameras, said input device has means controllable by the operator for designating any point on said monitor displaying said live video image, said control unit, when said point is so designated, having means to pan and tilt said one of said plurality of video surveillance cameras to center on said monitor displaying said live video image the point so designated, whereby the field of view of said one of said plurality of video surveillance cameras may be controlled and centered from said live video image.

12. A graphical work station for an integrated security system for controlling a plurality of security devices in a protected premises including a plurality of output devices and a plurality of video surveillance cameras, comprising a control unit communicating with a display unit having one or more monitors and an input device operable by an operator, (a) said control unit having storage means for storing a graphical image representing selected portions of the layout of said protected premises, including first icons representative of said output devices and second icons representative of said video surveillance cameras, each first icon representative of an output device being located on said graphical image in the same relative location as that output device is located in said protected premises and each second icon representative of a video surveillance camera being located on said graphical image in the same relative location as that video surveillance camera is located in said protected premises, (b) said control unit having means to display on said display unit said stored graphical image with said each first icon and said each second icon displayed in its respective location, (c) said input device having means controllable by said operator for selecting a give second icon on said graphical image representative of a given one of said plurality of video surveillance cameras to activate said given one of said plurality of video surveillance cameras, (d) said control unit having means responsive to the operation of said input device by said operator to select said given second icon on said graphical image representative of said given one of said plurality of video surveillance cameras, for displaying on said display unit a live video image from said given one of said plurality of video surveillance cameras, (e) said input device having means controllable by said operator for selecting a given first icon on said graphical image representative of a given one of said plurality of output devices to control said given one of said plurality of output devices, and (f) said control unit also having means for activating or deactivating an output device to control a given security function of said output device, (g) said control unit communicates with one or more VCRs, and (h) the control unit has means to generate a sub-image control palette on a monitor of the display unit, (i) said input device has means controllable by said operator to cooperate with said sub-image control palette to record the live video image from said given one of said plurality of video surveillance cameras on a VCR to play back at a later time.

13. A graphical work station in accordance with claim 12 wherein:

said control unit is programmable to automatically record selected events on one of said VCRs and said control unit has means to log and store data relating to said selected events for later recall.

* * * * *